(12) United States Patent
Tashiro et al.

(10) Patent No.: US 11,968,024 B1
(45) Date of Patent: Apr. 23, 2024

(54) FOOTPRINT FIXATION CONTROL LIMITED TO SPECIFIC CHANNELS CONSIDERING MOVEMENT AND ROTATION OF HAPS

(71) Applicant: SoftBank Corp., Tokyo (JP)

(72) Inventors: Koji Tashiro, Tokyo (JP); Kenji Hoshino, Tokyo (JP); Atsushi Nagate, Tokyo (JP)

(73) Assignee: SoftBank Corp., Tokyo (JP)

( * ) Notice: Subject to any disclaimer, the term of this patent is extended or adjusted under 35 U.S.C. 154(b) by 0 days.

(21) Appl. No.: 18/546,111

(22) PCT Filed: Jan. 12, 2022

(86) PCT No.: PCT/JP2022/000748
§ 371 (c)(1),
(2) Date: Aug. 11, 2023

(87) PCT Pub. No.: WO2022/176441
PCT Pub. Date: Aug. 25, 2022

(30) Foreign Application Priority Data

Feb. 17, 2021 (JP) ................................ 2021-023618

(51) Int. Cl.
*H04B 7/185* (2006.01)
*H04B 7/06* (2006.01)
(52) U.S. Cl.
CPC ....... *H04B 7/18504* (2013.01); *H04B 7/0695* (2013.01)
(58) Field of Classification Search
CPC .. H04B 7/18504; H04B 7/0617; H04B 7/185; H04B 7/18513; H04B 7/2041; H04W 84/06; H04W 16/28
See application file for complete search history.

(56) References Cited

U.S. PATENT DOCUMENTS

| 11,177,874 B2 | 11/2021 | Hoshino et al. |
| 11,522,601 B2 | 12/2022 | Omote et al. |
| 2016/0046387 A1 | 2/2016 | Frolov et al. |

FOREIGN PATENT DOCUMENTS

| JP | 2020-036070 A | 3/2020 |
| JP | 2020-80459 A | 5/2020 |

(Continued)

OTHER PUBLICATIONS

International Preliminary Report on Patentability, dated Aug. 22, 2023.

(Continued)

*Primary Examiner* — Khalid W Shaheed
(74) *Attorney, Agent, or Firm* — Muirhead and Saturnelli, LLC

(57) ABSTRACT

When there is a movement or attitude change of an upper-airspace staying type communication relay apparatus, it is suppressed of an increase in control signals and disconnection of communication with a terminal apparatus in a cell configuring a service area, and it is reduced of a circuit scale and power consumption of a base-station processing section. The base-station processing section of the communication relay apparatus performs, with respect to a radio resource part for control communication by which a communication is performed with plural terminal apparatuses located in a cell via a single or plural beams for control among downlink and uplink radio resources used for service links, a footprint fixation control for performing a precoding and a postcoding so as to fix a position of a footprint corresponding to the beam for control, based on information on at least one of a position and attitude of the communication relay apparatus, and does not perform the footprint fixation control on the basis of the information on the at least one of the position and attitude, with respect to downlink and uplink radio (Continued)

resource parts other than the radio resource part for control communication.

8 Claims, 16 Drawing Sheets

(56) References Cited

FOREIGN PATENT DOCUMENTS

| JP | 2021-19335 A | 2/2021 | |
|---|---|---|---|
| WO | WO-2020067825 A1 * | 4/2020 | ........ H04W 36/0058 |

OTHER PUBLICATIONS

Decision to Grant for Japanese Patent Application No. 2021-023618, dated Sep. 28, 2023.

Shoichi Sudo, et al., "Prototype Development and Evaluation of Service Link Antenna for Footprint Fixation in HAPS System", (Proceedings of the 2020 Society Conference of IEICE, Sep. 1, 2020, p. 111, B-1-111).

Shoichi Sudo, et al., "A Study on Footprint Fixation of Service Link in HAPS System", (Proceedings of the 2019 Society Conference of IEICE, Aug. 27, 2019, p. 148, B-1- 148).

PCT Application No. PCT/JP2022/000748 filed Jan. 12, 2022, International Search Report and Written Opinion dated Mar. 15, 2022.

DOCOMO Inovations, Inc., "Physical layer elemental technology in 5G and study status on high frequency band utilization,"NTT DOCOMO, vol. 25, No. 3, Oct. 2017.

R. Manoharan, "5G NR Beam Management and Beam Scheduling," Jul. 12, 2018.

Shoichi Sudo, "Prototype Development and Evaluation of Service Link Antenna for Footprint Fixation in HAPS System," 2020 IEICE.

Kazuki Matsuura, et al., "A Study on Beam Control for Feeder Link Antenna Considering HAPS Attitude," 2019 IEICE.

* cited by examiner

FOOTPRINT FIXATION CONTROL LIMITED TO SPECIFIC CHANNELS CONSIDERING MOVEMENT AND ROTATION OF HAPS

TECHNICAL FIELD

The present invention relates to a fixation control of a cell footprint of a service link in an upper-airspace staying type communication relay apparatus such as a HAPS.

BACKGROUND ART

There is conventionally known a communication relay apparatus such as a high altitude platform station (HAPS) (also referred to as "high altitude pseudo satellite") that can float and stay in an airspace (for example, see Patent Literature 1). There is known a communication of massive MIMO (hereinafter also referred to as "mMIMO") transmission method, as a communication between an upper-airspace staying type communication relay apparatus such as a HAPS and plural terminal apparatuses (hereinafter also referred to as "UE") located in a cell formed by the upper-airspace staying type communication relay apparatus. The mMIMO is a radio transmission technology that realizes high-capacity and high-speed communication by transmitting and receiving data using an array antenna having a large number of antenna elements, and can improve a communication quality of the entire cell because it is possible to communicate by directing an appropriate beam for each UE according to a communication environment of each UE.

Even when performing a communication of the mMIMO transmission method in which the beam is directed to each UE for communication, control-related signals necessary for starting a cell connection, such as synchronization signals (SS) periodically transmitted from the base station into the cell and broadcast channel (PBCH) signals for notifying main radio parameters, need to reach all UEs in the cell. Therefore, in the 5th generation mobile communication system, a block of SS and PBCH (hereinafter referred to as "SSB") is defined as one unit, and a (Beam Sweeping) technique is adopted, in which the control-related signals such as SS and PBCH are transmitted to each UE via plural beams (hereinafter also referred to as "SSB beams") different from each other while switching the SSB beams for plural area parts configuring the cell (see Non-Patent Literature 1 and Non-Patent Literature 2).

CITATION LIST

Patent Literature

Patent Literature 1: U.S. Patent Application Publication No. 2016/0046387.

Non-Patent Literature

Non-Patent Literature 1: Kazuaki Takeda, 5 others, "Study status on physical layer elemental technology and high frequency band use in 5G", NTT DOCOMO Technical Journal, Vol. 25, No. 3 (October 2017).

Non-Patent Literature 2: R. Manoharan, "5G NR Beam Management and Beam Scheduling (everything about the beams)", [online], Jul. 12, 2018, Linked in, [searched Jan. 21, 2021], Internet <https://www.linkedin.com/pulse/5g-nr-beam-management-scheduling-everything-beams-ramalingam>.

SUMMARY OF INVENTION

Technical Problem

In the upper-airspace staying type communication relay apparatus such as the HAPS described above, since the attitude and position change due to the influence of air flow and atmospheric pressure in the stratosphere, etc. where the communication relay apparatus is located, the footprint of the SSB beam on the cell formed on the ground (or on the sea) moves and deforms. For example, when the body of the communication relay apparatus (HAPS) rotates in yaw, it is expected that a large number of terminal apparatuses in the cell (service area) perform the connection restoration operation by BFR (Beam Failure Recovery) (see Non-Patent Literature 2), and an increase in control signals by the BFR becomes a problem. Further, when the body of the communication relay apparatus (HAPS) rolls or pitches, it is expected that a large number of terminal apparatuses in the cell (service area) perform the connection restoration operation by the BFR (see Non-Patent Literature 2), and an increase in control signals by the BFR becomes a problem. Furthermore, in this case, it is expected that a large number of terminal apparatuses are out of the service area, and a disconnection of communication becomes a problem.

In the next-generation mobile communication systems such as the 5th generation, its broadband is accelerating more and more. When trying to control the beam for fixing the footprint of the cell over the entire frequency band that has been widened, there is a problem of increasing the circuit scale and power consumption in the base-station processing apparatus.

Solution to Problem

A communication relay apparatus according to a first aspect of the present invention is an upper-airspace staying type communication relay apparatus that wirelessly communicates with a terminal apparatus. This communication relay apparatus comprises an array antenna having plural antenna elements that forms a service link cell capable of performing a radio communication with the terminal apparatus, an information obtaining section for obtaining information on at least one of a position and attitude of the communication relay apparatus, and a base-station processing section for performing a baseband process including a process for applying a precoding for beamforming in a frequency domain to a downlink transmission signal to be transmitted via the array antenna. The base-station processing section performs, with respect to a radio resource part for control communication by which a communication via a single or plural beams for control formed for the cell is performed among downlink radio resources used for the service link, a footprint fixation control for performing a precoding for beamforming in the frequency domain so as to fix a position of a footprint corresponding to the beam for control based on information on at least one of the position and attitude of the communication relay apparatus obtained by the information obtaining section, and does not perform, with respect to downlink radio resource parts other than the radio resource part for control communication, the footprint fixation control on the basis of the information on at least one of the position and attitude of the communication relay apparatus.

In the foregoing communication relay apparatus according to the first aspect, the base-station processing section may perform, with respect to a radio resource part for individual communication by which a downlink communication via an individual beam with each of plural terminal apparatuses located in the cell is performed among the downlink radio resource parts other than the radio resource part for control communication, a precoding for beamforming for individual communication in a frequency domain for each of the terminal apparatuses.

In the foregoing communication relay apparatus according to the first aspect, the radio resource part for downlink control communication may include a radio resource part to which a synchronization signal (SS) and a broadcast channel (PBCH) are assigned.

In the foregoing communication relay apparatus according to the first aspect, the radio resource part for downlink control communication may include a radio resource part to which a physical downlink control channel (PDCCH) is assigned, and a radio resource part to which a physical downlink shared channel (PDSCH) before completion of an initial access from the terminal apparatus to the cell is assigned.

In the foregoing communication relay apparatus according to the first aspect, in the footprint fixation control, a digital beamforming control may be performed to apply beamforming (BF) weights in a frequency domain to the transmission signal by limiting the band of the radio resource part for control communication.

In the foregoing communication relay apparatus according to the first aspect, in the footprint fixation control, phases and amplitudes of modulation symbols to be transmitted in the radio resource part for control communication may be controlled so that a main beam of the beam for control is directed toward a target point set in advance.

In the foregoing communication relay apparatus according to the first aspect, the beamforming (BF) weight may be calculated based on information on a shape of the array antenna and information on the position and attitude of the communication relay apparatus.

In the foregoing communication relay apparatus according to the first aspect, the communication relay apparatus may pre-calculate and store beamforming (BF) weights in association with each of plural sets of positions and attitudes different from each other on a predicted moving route of the communication relay apparatus with reference to a position of a service area, and select a beamforming (BF) weight corresponding to the position and attitude of the communication relay apparatus obtained by the information obtaining section, from the stored beamforming (BF) weights corresponding to each of the plural sets of positions and attitudes.

In the foregoing communication relay apparatus according to the first aspect, the baseband process of the base-station processing section may include a process of applying a postcoding for beamforming in the frequency domain to the reception signal received via the array antenna, and the base-station processing section may perform, with respect to a radio resource part for control communication by which an uplink communication via a single or plural beams for control formed for the cell is performed among uplink radio resources used for the service link, a footprint fixation control for performing a postcoding for beamforming in the frequency domain so as to fix a position of a footprint corresponding to the beam for control based on information on at least one of a position and attitude of the communication relay apparatus obtained by the information obtaining section, and may not perform, with respect to uplink radio resource parts other than the radio resource part for control communication, the footprint fixation control on the basis of the information on at least one of the position and attitude of the communication relay apparatus.

A communication relay apparatus according to a second aspect of the present invention is an upper-airspace staying type communication relay apparatus that wirelessly communicates with a terminal apparatus. This communication relay apparatus comprises an array antenna having plural antenna elements that forms a service link cell capable of performing a radio communication with the terminal apparatus, an information obtaining section for obtaining information on at least one of a position and attitude of the communication relay apparatus, and a base-station processing section that performs a baseband process including a process for applying a postcoding for beamforming in a frequency domain to an uplink reception signal received via the array antenna. The base-station processing section performs, with respect to a radio resource part for control communication by which an uplink communication via a single or plural beams for control formed for the cell among uplink radio resources used for the service link is performed, a footprint fixation control for performing a postcoding for beamforming in the frequency domain so as to fix a position of a footprint corresponding to the beam for control based on information on at least one of the position and attitude of the communication relay apparatus obtained by the information obtaining section, and does not perform, with respect to uplink radio resource parts other than the radio resource part for control communication, the footprint fixation control on the basis of the information on at least one of the position and attitude of the communication relay apparatus.

In the communication relay apparatus according to the first aspect and the communication relay apparatus according to the second aspect that perform the uplink footprint fixation control, the base-station processing section may perform, with respect to a radio resource part for individual communication by which an uplink communication via an individual beam with each of plural terminal apparatuses located in the cell is performed among the uplink radio resource parts other than the radio resource part for control communication, a precoding for beamforming for individual communication in the frequency domain for each of the terminal apparatuses.

In the communication relay apparatus according to the first aspect and the communication relay apparatus according to the second aspect that perform the uplink footprint fixation control, the radio resource part for uplink control communication may include a radio resource part to which a physical random access channel (PRACH) is assigned.

In the communication relay apparatus according to the first aspect and the communication relay apparatus according to the second aspect that perform the uplink footprint fixation control, the radio resource part for uplink control communication may include a radio resource part to which a physical uplink control channel (PUCCH) is assigned, and a radio resource part to which a physical uplink shared channel (PUSCH) before completion of the initial access from the terminal apparatus to the cell is assigned.

In the communication relay apparatus according to the first aspect and the communication relay apparatus according to the second aspect that perform the uplink footprint fixation control, in the footprint fixation control, a digital beamforming control may be performed to apply beamforming (BF) weights in the frequency domain to the reception signal by limiting the band of the radio resource part for control communication.

In the communication relay apparatus according to the first aspect and the communication relay apparatus according to the second aspect that perform the uplink footprint fixation control, in the footprint fixation control, a phase and an amplitude of a modulation symbol received in the radio resource part for control communication may be controlled so that a main beam of the beam for control is directed toward a target point set in advance.

In the communication relay apparatus according to the first aspect and the communication relay apparatus according to the second aspect that perform the uplink footprint fixation control, the beamforming (BF) weight may be calculated based on information on the shape of the array antenna and information on the position and attitude of the communication relay apparatus.

In the communication relay apparatus according to the first aspect and the communication relay apparatus according to the second aspect that perform the uplink footprint fixation control, the communication relay apparatus may pre-calculate and store beamforming (BF) weights in association with each of plural sets of positions and attitudes different from each other on a predicted moving route of the communication relay apparatus with reference to a position of a service area, and select a beamforming (BF) weight corresponding to the position and attitude of the communication relay apparatus obtained by the information obtaining section from the stored beamforming (BF) weights corresponding to each of the plural sets of positions and attitudes.

Advantageous Effects of Invention

According to the present invention, even if there is a movement and attitude change of the upper-airspace staying type communication relay apparatus, it is possible to suppress a movement and deformation of the footprint of the beam for control, that uses a specific radio resource part assigned to the control channel or the like in the cells configuring the service area, and it is possible to suppress an increase in control signals and disconnection of communication with terminal apparatuses in a cell, and to reduce the circuit scale and power consumption of the base-station processing section.

DESCRIPTION OF EMBODIMENTS

Hereinafter, embodiments of the present invention are described with reference to the drawings.

A system according to embodiments described herein is a communication system (HAPS system), that is provided with an upper-airspace staying type communication relay apparatus (HAPS) for forming a cell toward the ground or the sea and performing massive MIMO (hereinafter also referred to as "MIMO") radio communication with plural terminal apparatuses (UE) located in the cell, capable of suppressing movement and deformation of footprints of SSB beams (beams for control) that use specific radio resource parts assigned to the SSB, etc. including control channels in the cell configuring a service area, even if there is a movement and attitude change of an airframe, capable of suppressing an increase in control signals and a disconnection of communication with the UE in the cell, and capable of reducing a circuit scale and power consumption of a base-station processing section. The communication system according to the present embodiment is suitable for realizing a three-dimensional network for the next-generation mobile communication such as the fifth generation that supports simultaneous connection to a large number of terminal apparatuses and low delay, etc.

Figure 1:
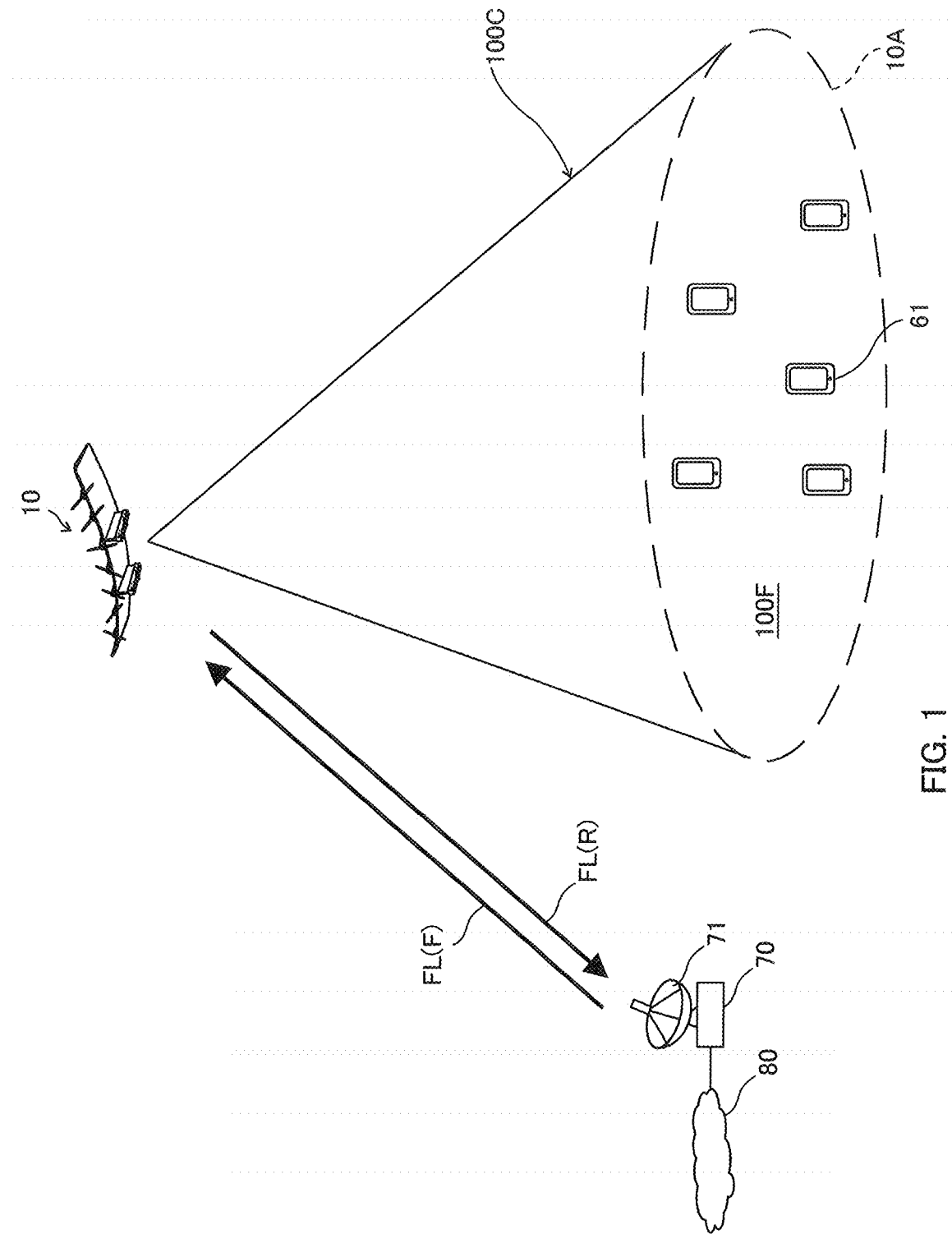
FIG. 1 is a schematic configuration diagram showing an example of an overall configuration of a communication system including a HAPS according to an embodiment.

FIG. 1 is a schematic configuration diagram showing an example of an overall configuration of a communication system including a HAPS (upper-airspace staying type communication relay apparatus) according to an embodiment. In FIG. 1, the communication system of the present embodiment (hereinafter also referred to as "HAPS system") is provided with a High-Altitude Platform Station (HAPS) (also referred to as "high altitude pseudo satellite" or "stratosphere platform") 10 as an upper-airspace staying type communication relay apparatus (radio relay apparatus). The HAPS 10 is located in an airspace at a predetermined altitude, and forms a three-dimensional cell 100C. The HAPS 10 is a floating object (for example, solar plane, airship, drone, balloon) that is controlled by autonomous control or external control so as to float or fly and be located in an airspace (floating airspace) at a predetermined altitude from the ground level or the sea level, and has a relay communication station mounted thereon. The upper-airspace staying type communication relay apparatus may be an artificial satellite with a relay communication station mounted thereon. Moreover, the communication system of the present embodiment may include one or more terminal apparatuses with which the HAPS 10 communicates, and may include a gateway station (feeder station) described below.

The airspace in which the HAPS 10 is located is, for example, a stratospheric airspace at an altitude of 11 [km] or more and 50 [km] or less on the ground (or on the water such as the sea or lake). The airspace may be an airspace at an altitude of 15 [km] or more and 25 [km] or less where weather conditions are relatively stable, and may be an airspace at an altitude of about 20 [km] in particular.

Since the HAPS is lower than the flight altitude of general artificial satellites and flies higher than base stations on the ground or on the sea, a high line-of-sight rate can be ensured while the propagation loss is smaller than that of satellite communication. This feature enables a communication service from the HAPS to a terminal apparatus (mobile station) 61, which is a user apparatus such as a cellular mobile terminal on the ground or on the sea. By providing the communication service from the HAPS, it is possible to cover a wide area with a small number of HAPS at once, where was previously covered by many base stations on the ground or on the sea, so there is an advantage capable of providing a stable communication service at low cost.

The relay communication station of the HAPS 10 forms the three-dimensional cell 100C capable of performing a radio communication with the UE 61, by forming a beam for radio communication with a user's terminal apparatus (hereinafter referred to as "UE" (user equipment)) toward the ground surface (or sea surface). A radius of a service area 10A consisting of a footprint 100F on the ground (or on the sea) of the three-dimensional cell 100C is, for example, several tens [km] to 100 [km].

In the present embodiment, the relay communication station of the HAPS 10 may form plural three-dimensional cells (for example, three cells or seven cells), and form the service area 10A consisting of plural footprints on the ground (or on the sea) of the plural three-dimensional cells.

The relay communication station of the HAPS 10 is, for example, a base station (for example, eNodeB, gNodeB) that wirelessly communicates with a gateway station (also referred to as a "feeder station") 70 as a relay station connected to a core network of a mobile communication network 80 on the ground (or on the sea) side and has an antenna 71 facing the upper airspace. The relay communication station of the HAPS 10 is connected to the core network of the mobile communication network 80 via the feeder station 70 disposed on the ground or on the sea. The communication between the HAPS 10 and the feeder station 70 may be performed by a radio communication using a radio wave such as a microwave, or may be performed by an optical communication using a laser light or the like.

The HAPS 10 may autonomously control its own floating movement (flight) and a process in the relay communication station by executing a control program by a control section configured with a computer incorporated inside or the like. For example, each of the HAPS 10 may obtain its own current position information (for example, GPS position information), position control information (for example, flight schedule information) stored in advance, position information on another HAPS located in a peripheral space, or the like, and may autonomously control the floating movement (flight) and the process in the relay communication station based on these kinds of information.

Further, the floating movement (flight) of the HAPS 10 and the process in the relay communication station may be controlled by a management apparatus (also referred to as a "remote control apparatus") as a management apparatus provided in a communication center of the mobile communication network 80 or the like. The management apparatus can be configured with, for example, a computer apparatus such as a PC, a server, or the like. In this case, the HAPS 10 may incorporate a communication terminal apparatus for control (for example, mobile communication module) so as to be capable of receiving control information from the management apparatus and transmitting various kinds of information such as monitoring information to the management apparatus, and may be assigned terminal identification information (for example, IP address, phone number, etc.) so as to be identified from the management apparatus. The MAC address of the communication interface may be used to identify the communication terminal apparatus for control. Moreover, the HAPS 10 may transmit information on the floating movement (flight) of the own HAPS or a surrounding HAPS and the process in the relay communication station, and monitoring information such as information on a status of the HAPS 10 and observation data obtained by various kinds of sensors, to a predetermined destination such as the management apparatus. The control information may include information on a target flight route of the HAPS. The monitoring information may include at least one of information on current position, flight-route history information, velocity relative to the air, velocity relative to the ground and propulsion direction of the HAPS 10, wind velocity and wind direction around the HAPS 10, and atmospheric pressure and temperature around the HAPS 10.

Figure 2:
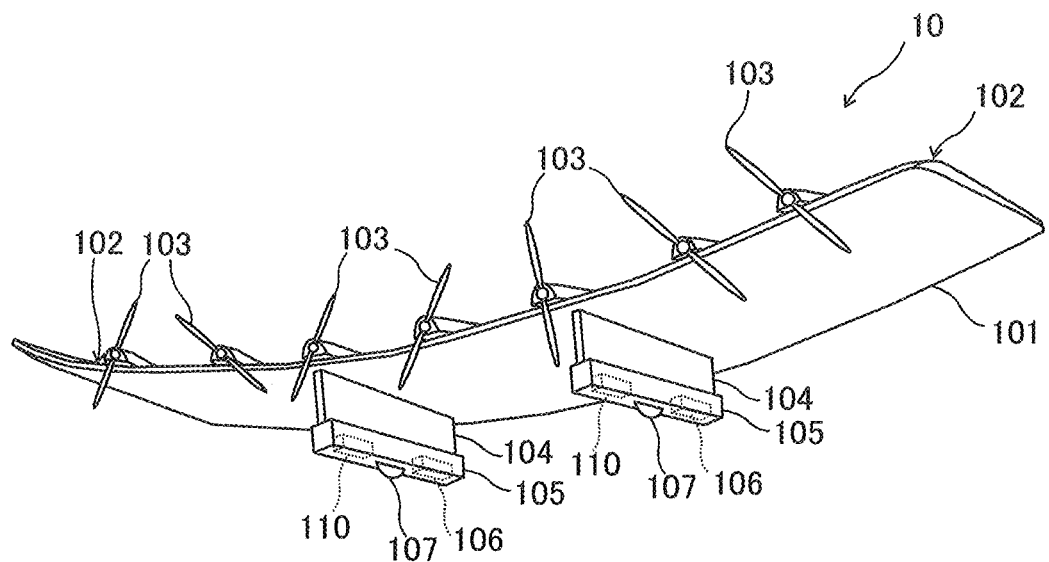
FIG. 2 is a perspective view showing an example of a HAPS of an embodiment.

FIG. 2 is a perspective view showing an example of the HAPS 10 used in the communication system of the embodiment.

The HAPS 10 in FIG. 2 is a solar-plane type HAPS, and is provided with a main wing section 101 with both ends in the longitudinal direction curved upward, and plural motor-driven propellers 103 as propulsion apparatuses for bus power system on one end section in the short direction of the main wing section 101. On the upper surface of the main wing section 101, a photovoltaic-power generation panel (hereinafter referred to as "solar panel") 102 is provided as a photovoltaic-power generation section having a photovoltaic-power generation function. At two locations in the longitudinal direction of the lower surface of the main wing section 101, plural pods 105 serving as equipment housing sections for housing mission equipment are connected via plate-like connecting sections 104. Inside each pod 105, a relay communication station 110 as a mission equipment and a battery 106 are accommodated. On the undersurface side of each pod 105, wheels 107 are provided for use during takeoff and landing. The electric power generated by the solar panel 102 is stored in the battery 106, the electric power supplied from the battery 106 rotates the motor of the propeller 103, and the radio relay process is performed by the relay communication station 110.

Figure 3:
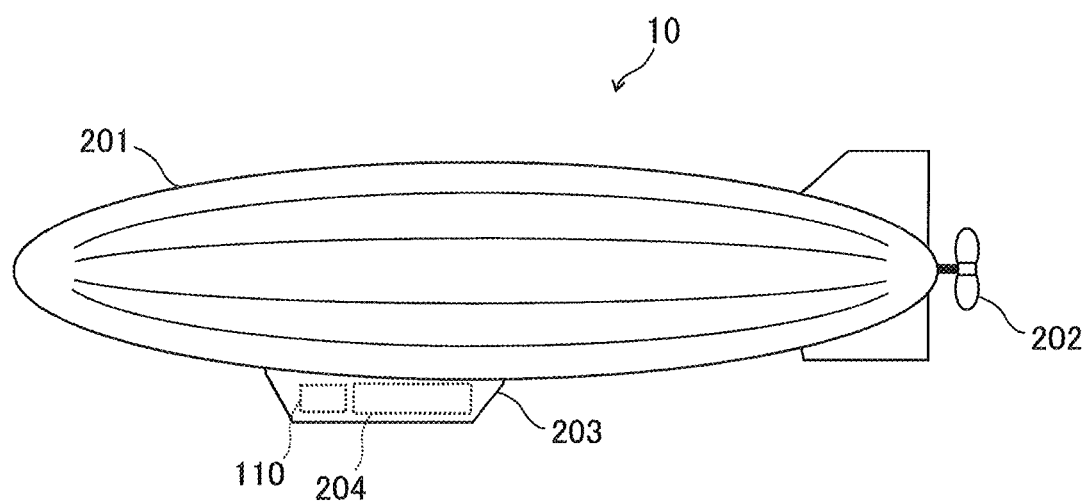
FIG. 3 is a side view showing another example of a HAPS of an embodiment.

FIG. 3 is a perspective view showing another example of HAPS 10 used in the communication system of the embodiment. The HAPS 10 in FIG. 3 is an unmanned-airship type HAPS, and it can be equipped with a large-capacity battery because it has a large payload. The HAPS 10 is provided with an airship body 201 filled with a gas such as helium gas for floating by buoyancy, a motor-driven propeller 202 as a propulsion apparatus for bus power system, and an equipment housing section 203 for housing mission equipment. Inside the equipment housing section 203, the relay communication station 110 and the battery 204 are accommodated. The electric power supplied from the battery 204 drives the motor of the propeller 202 to rotate, and the relay communication station 110 performs the radio relay process. It is noted that, a solar panel having a photovoltaic-power generation function may be provided on the upper surface of the airship body 201, and the electric power generated by the solar panel may be stored in the battery 204.

In the following embodiments, although it is illustrated and described for a case in which the upper-airspace staying type communication relay apparatus for wirelessly communicating with the UE 61 is either one of the solar-plane type HAPS 10 in FIG. 2 or the unmanned-airship type HAPS 20, the upper-airspace staying type communication relay apparatus may be the unmanned-airship type HAPS 10 in FIG. 3. The following embodiments can be similarly applied to other upper-airspace staying type communication relay apparatuses other than the HAPS 10.

Links FL(F) and FL(R) between the HAPS 10 and a fixed base station via a gateway station (hereinafter abbreviated as "GW station") 70 as a feeder station are called "feeder links", and a link between the HAPS 10 and the UE 61 is called a "service link". In particular, a section between the HAPS 10 and the GW station 70 is called a "radio section of feeder link". Moreover, a downlink of communication from the GW station 70 to the UE 61 via the HAPS 10 is called a "forward link" FL(F), and an uplink of communication from the UE 61 to the GW station 70 via the HAPS 10 is also called a "reverse link" FL(R).

Duplex methods of uplink and downlink for radio communication with the UE 61 via the relay communication station 110 are not limited to specific methods, and may be, for example, a time division duplex method (Time Division Duplex: TDD) or a frequency division duplex method (Frequency Division Duplex: FDD). An access method for radio communication with the UE 61 via the relay communication station 110 is not limited to the specific method, but may be, for example, FDMA (Frequency Division Multiple Access) method, TDMA (Time Division Multiple Access) method, CDMA (Code Division Multiple Access) method, or OFDMA (Orthogonal Frequency Division Multiple Access).

In the radio communication of the service link of the present embodiment, a massive MIMO (Multi-Input Multi-Output) transmission method is used, which has functions of diversity/coding, transmission beam forming, spatial division multiplexing (SDM: Spatial Division Multiplexing), etc., and performs a beamforming transmission simultaneously for each of the plural UEs 61 using a multi-element array antenna. By using the mMIMO transmission method, each UE 61 can direct an appropriate beam for communication according to the communication environment of each UE 61, so that the communication quality of the entire cell can be improved.

Figure 4:
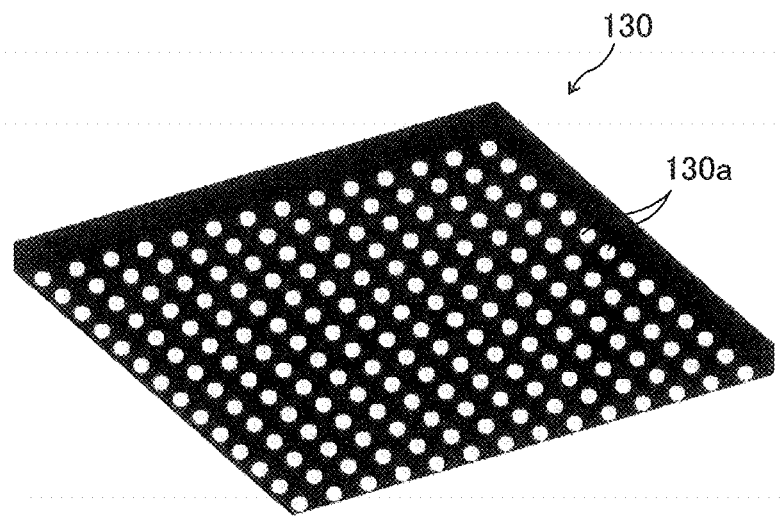
FIG. 4 is a perspective view showing an example of an array antenna of a service link of a HAPS of an embodiment.
Figure 5:
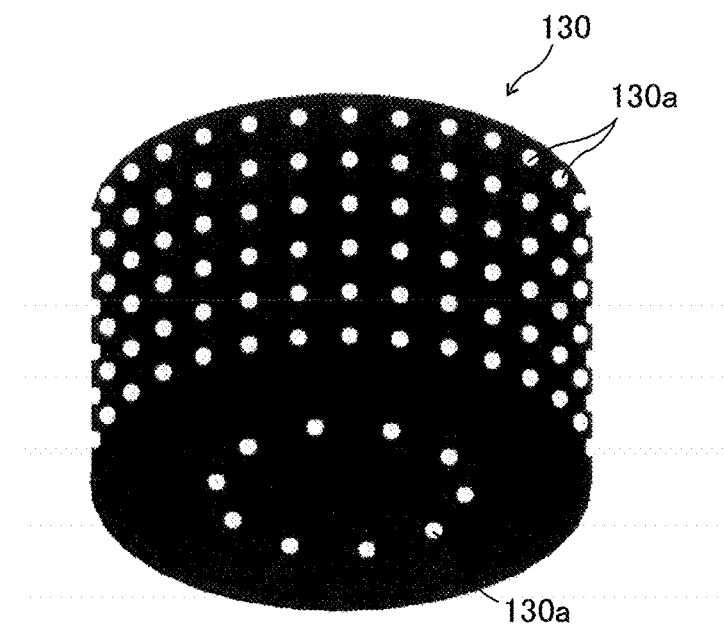
FIG. 5 is a perspective view showing another example of an array antenna of a service link of a HAPS of an embodiment.

Each of FIG. 4 and FIG. 5 is perspective view showing an example of an array antenna 130 configured with multiple elements that can be used for the mMIMO transmission method in the HAPS 10 of the present embodiment.

The array antenna 130 in FIG. 4 is a planar-type array antenna, which has a planar antenna base, and in which a large number of antenna elements 130a such as patch antennas are two-dimensionally disposed along a planar antenna surface of the antenna base in axial directions orthogonal to each other.

The array antenna 130 in FIG. 5 is a cylinder-type array antenna, which has a cylindrical or columnar antenna base, and in which a large number of antenna elements 130a such as patch antennas are disposed along an axial direction and a circumferential direction of a circumferential side surface as a first antenna surface of the antenna base. In the array antenna 130 of FIG. 5, as shown in the figure, plural antenna elements 130a such as patch antennas may be disposed in a circular shape along a bottom surface as a second antenna surface. The antenna base in FIG. 5 may be a polygonal tubular or polygonal cylindrical antenna base.

It is noted that, the shape of the array antenna 130, and the number, types and placement of the antenna elements are not limited to those exemplified in FIG. 4 and FIG. 5.

Figure 6:
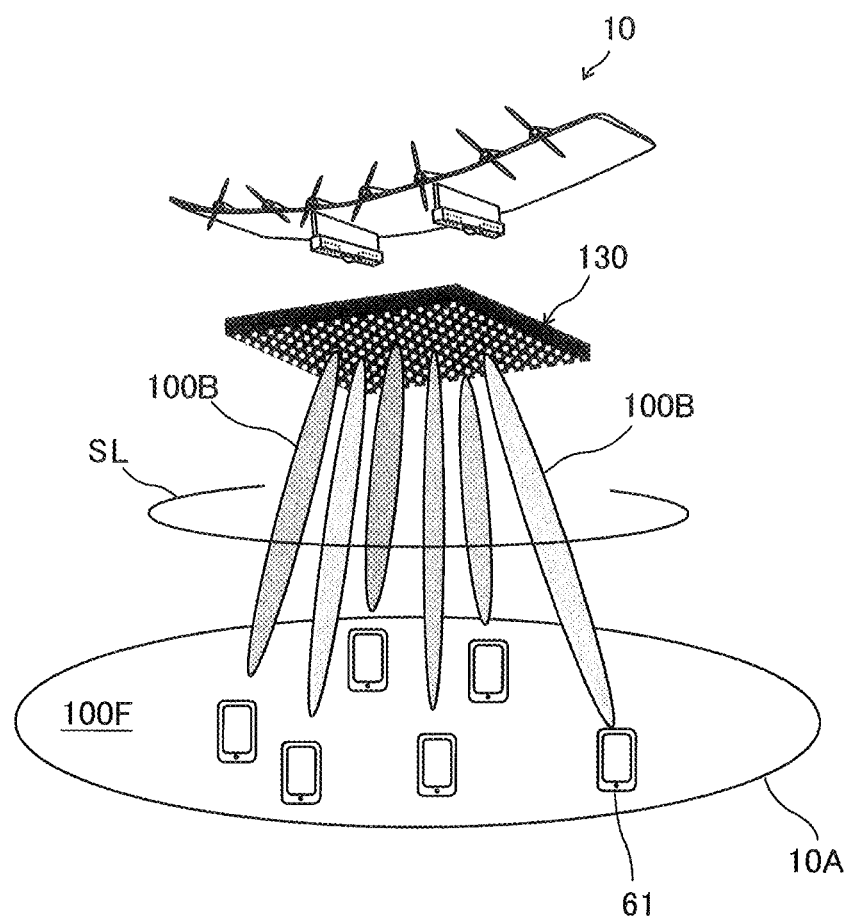
FIG. 6 is an illustration showing an example of beamforming in massive MIMO using an array antenna of a HAPS.

FIG. 6 is an illustration showing an example of a beamforming in the mMIMO transmission method using the array antenna 130 of the HAPS 10. In a service link SL between the array antenna 130 of the HAPS 10 and a service area 10A (footprint 100F of cell 100C) of FIG. 6, communication quality can be improved by using the mMIMO transmission method and performing a beamforming for communication by directing an appropriate beam 100B individually to each UE 61 according to the communication environment of each UE 61.

Figure 7:
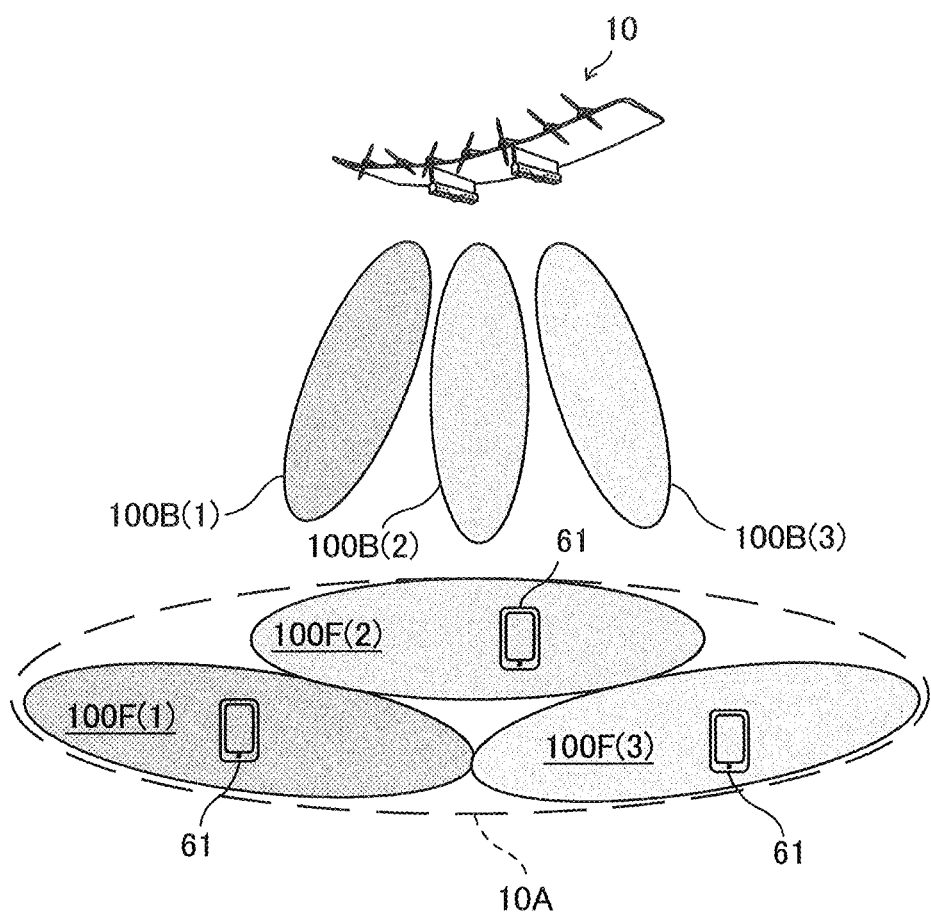
FIG. 7 is an illustration showing an example of plural SSB beams formed in a service link cell of a HAPS of an embodiment.
Figure 8:
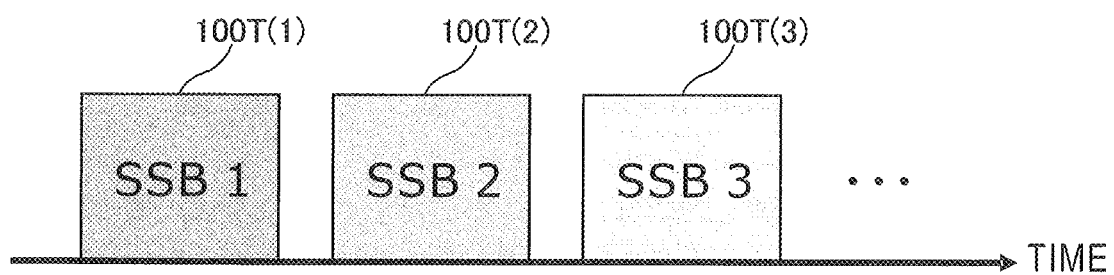
FIG. 8 is an illustration showing an example of switching on the time axis of the plural SSB beams in FIG. 7.

FIG. 7 is an illustration showing an example of plural SSB beams 100B(1) to 100B(3) formed in the cell 100C of the service link of the HAPS 10 of the present embodiment. FIG. 8 is an illustration showing an example of switching on the time axis of the plural SSB beams 100B(1) to 100B(3) in FIG. 7. Even in the communication of the mMIMO transmission method in which the beam 100B is individually directed to each UE 61 for communication, control-related signals necessary for starting a cell connection, such as a synchronization signal (SS) periodically transmitted from the HAPS 10 to the inside of the cell 100C and a broadcast channel (PBCH) for notifying main radio parameters, need to reach all UEs 61 within the cell 100C. Therefore, in the present embodiment, an SSB is defined as one unit, which is a block of SS and PBCH in radio resources as shown in FIG. 7 and FIG. 8, while switching the SSB beams 100B(1) to 100B(3) as plural beams for control different from each other for plural area parts (hereinafter referred to as "SSB area") configuring the cell 100C, the control-related signals related to a radio communication control such as SS and PBCH are transmitted to each UE 61.

Figure 9:
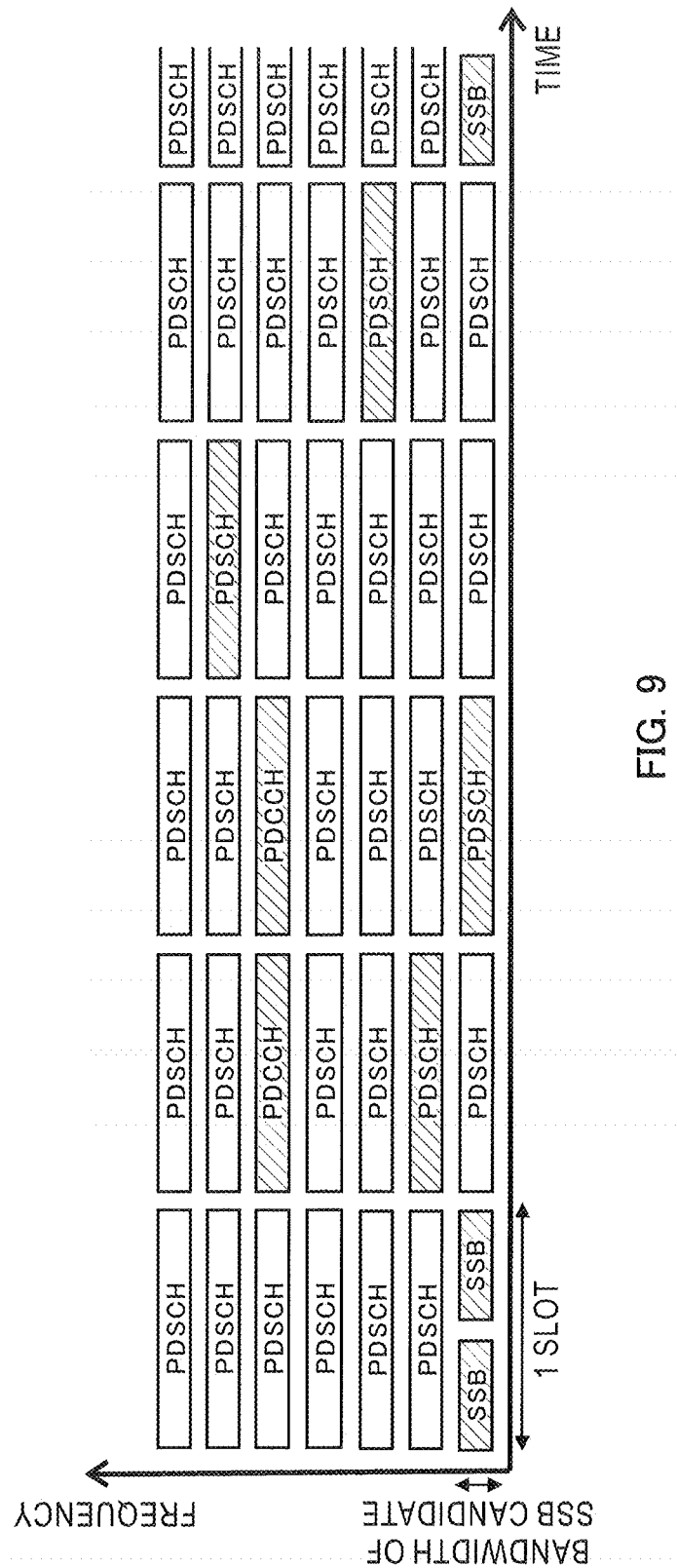
FIG. 9 is an illustration showing an example of placement of physical channels related to SSB beams in a downlink radio resource.

FIG. 9 is an illustration showing an example of placement of physical channels (SSB beam-related channels) related to the SSB beams 100B(1) to 100B(3) in the downlink radio resource. In the example of FIG. 9, among the physical channels assigned to downlink resource blocks defined as one unit of 1 ms slots and 15 kHz subcarriers, an SSB consisting of SS (synchronization signal) and PBCH (physical downlink broadcast channel), PDCCH (physical downlink control channel), and PDSCH (physical downlink shared channel) before completion of an initial access, which are hatched in the figure, are physical channels related to the SSB beams 100B(1) to 100B(3) (SSB beam-related channels). The resource block (RB) assigned to these SSB beam-related channels is a radio resource part for a downlink control communication. Other PDSCH (physical downlink shared channel) after completion of the initial access are physical channels to which UE-specific beams are applied, which are used for a downlink communication of the mMIMO transmission method.

Figure 10:
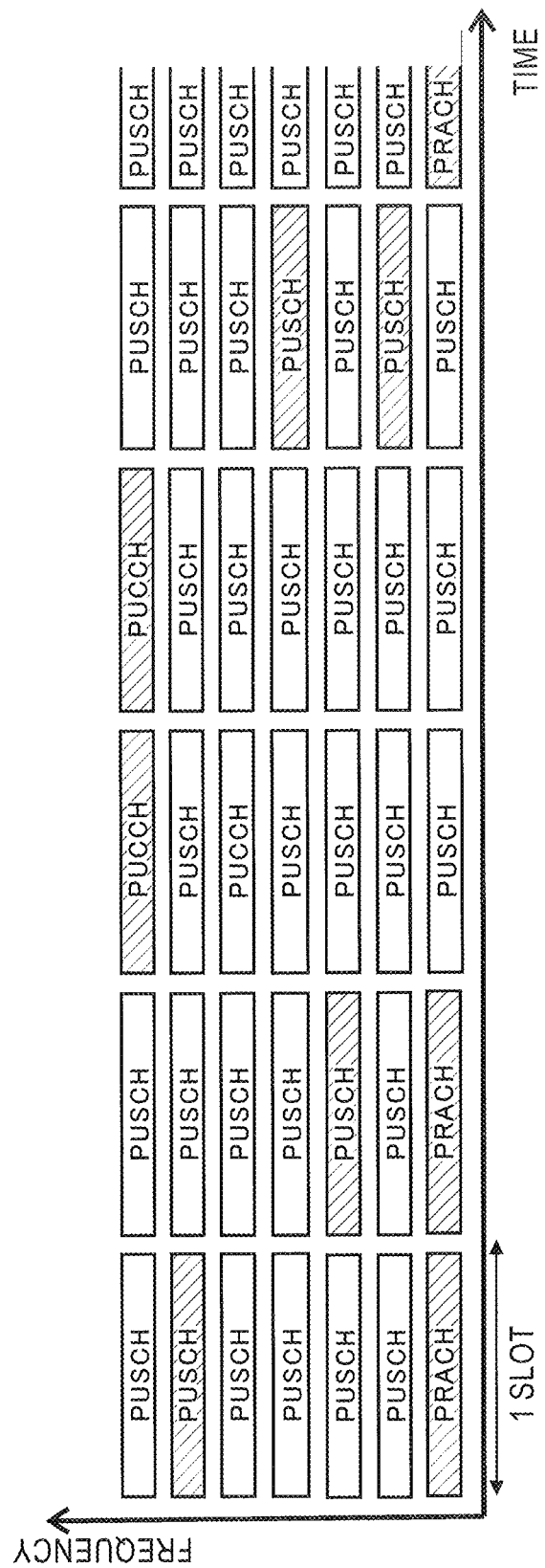
FIG. 10 is an illustration showing an example of placement of physical channels related to SSB beams in an uplink radio resource.

FIG. 10 is an illustration showing an example of placement of physical channels (SSB beam-related channels) related to the SSB beams 100B(1) to 100B(3) in the uplink radio resource. In the example of FIG. 10, among the physical channels assigned to uplink resource blocks defined as one unit of 1 ms slots and 15 kHz subcarriers, PRACH (physical random access channel), PUCCH (physical uplink control channel), and PUSCH (physical uplink shared channel) before completion of the initial access, which are hatched in the figure, are physical channels related to the SSB beams 100B(1) to 100B(3) (SSB beam-related channels). The resource block (RB) assigned to these SSB beam-related channels is a radio resource part for an uplink control communication. Other PUSCH (physical uplink shared channel) after completion of the initial access are physical channels to which the UE-specific beams are applied, which are used for an uplink communication of the mMIMO transmission method.

The HAPS 10, which transmits control related signals such as SS and PBCH via the SSB beams 100B(1) to 100B(3) in this way, changes in attitude and position due to the influence of air flow and atmospheric pressure in the stratosphere where the HAPS 10 is located, and the like. Therefore, the footprint corresponding to each SSB beam of the cell 100C formed on the ground (or on the sea) by the HAPS 10 moves and deforms, which may cause an increase in control signals and disconnection of communication as described below.

Figure 11:
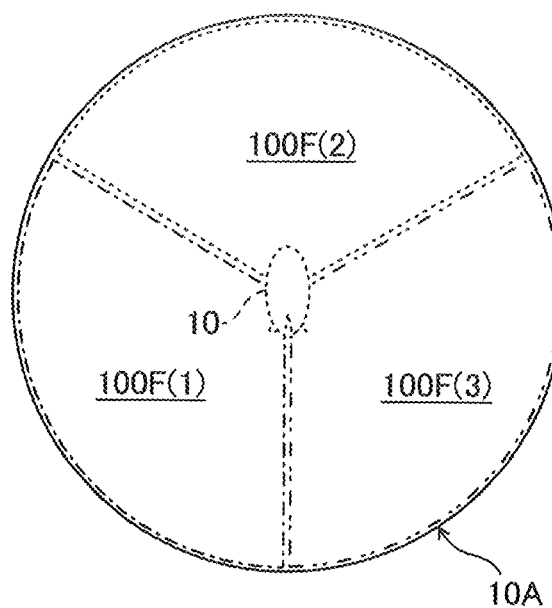
FIG. 11 is an illustration showing an example of a state before yaw rotation of a HAPS of an embodiment.

FIG. 11 is an illustration showing an example of a state before yaw rotation of the HAPS 10 of the embodiment. In the airship type HAPS 10 exemplified in FIG. 11, three SSB beams 100B(1) to 100B(3) with orientations different from each other are formed for a single cell, and three-divided footprints 100F(1) to 100F(3) corresponding to the SSB beams 100B(1) to 100B(3) are located in the service area 10A.

Figure 12:
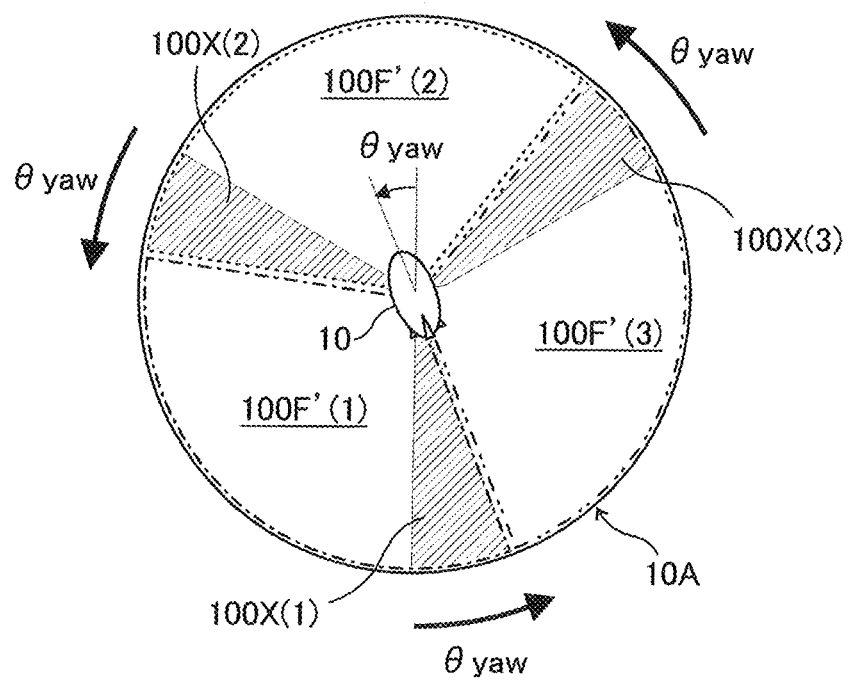
FIG. 12 is an illustration showing an example of a change in footprints of SSB beams due to a yaw rotation of a HAPS according to a comparative reference example.

FIG. 12 is an illustration showing an example of changes in the footprints of the SSB beams due to the yaw rotation of the HAPS 10 according to a comparative reference example. When the HAPS 10 exemplified in FIG. 11 rotates by an angle θyaw in the left rotation direction in the figure, the SSB beams 100B(1) to 100B(3) are also rotated by the same angle θyaw as shown in FIG. 12, and the footprints 100F'(1) to 100F'(3) corresponding to the SSB beams 100B(1) to 100B(3) are also rotated by the angle θyaw and shifted in position. It is expected that many UEs 61 located in areas 100X(1) to 100X(3), in which the SSB beams to be received have changed due to this shift of the footprints, respectively performs a connection recovery operation by the BFR described above, and the number of control signals by the BFR may increase.

Figure 13:
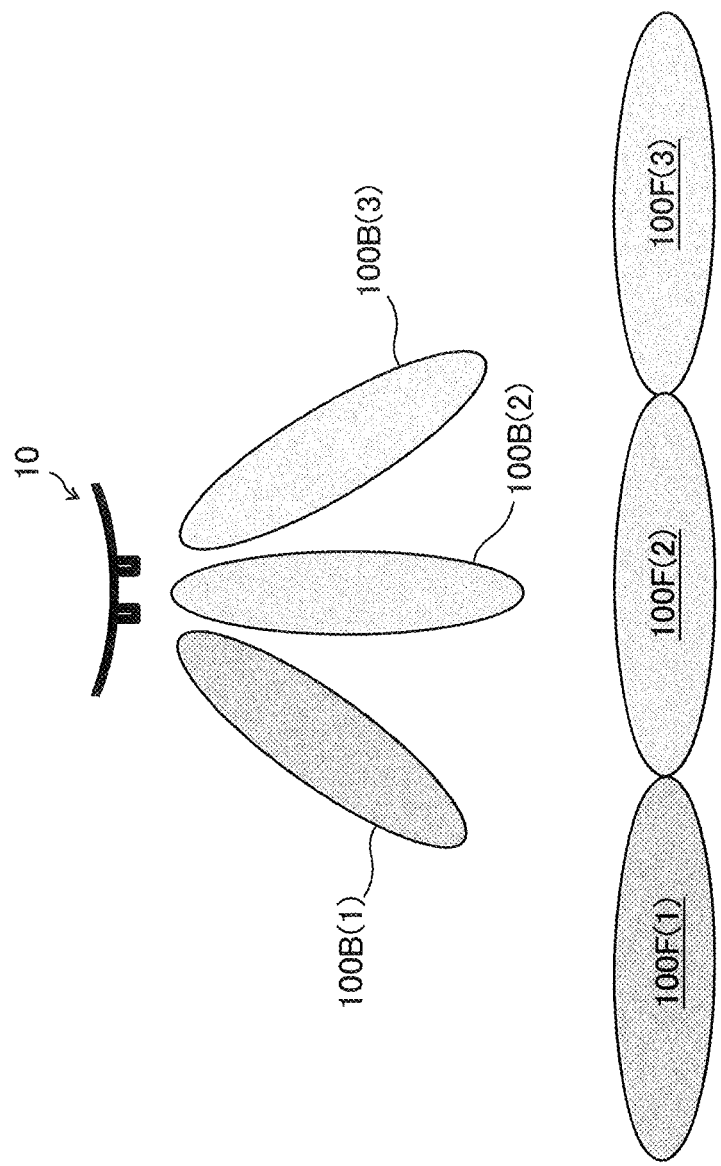
FIG. 13 is an illustration showing an example of a state before roll rotation of a HAPS of an embodiment.

FIG. 13 is an illustration showing an example of a state before roll rotation of the HAPS 10 of the embodiment. In the solar-plane type HAPS 10 exemplified in FIG. 13, three SSB beams 100B(1) to 100B(3) with orientations different from each other are formed for a single cell, and three-divided footprints 100F(1) to 100F(3) corresponding to the SSB beams 100B(1) to 100B(3) are located in the service area. It is noted that, in FIG. 13, the footprints 100F(1) to 100F(3) are shown side by side in the figure for convenience of explanation.

Figure 14:
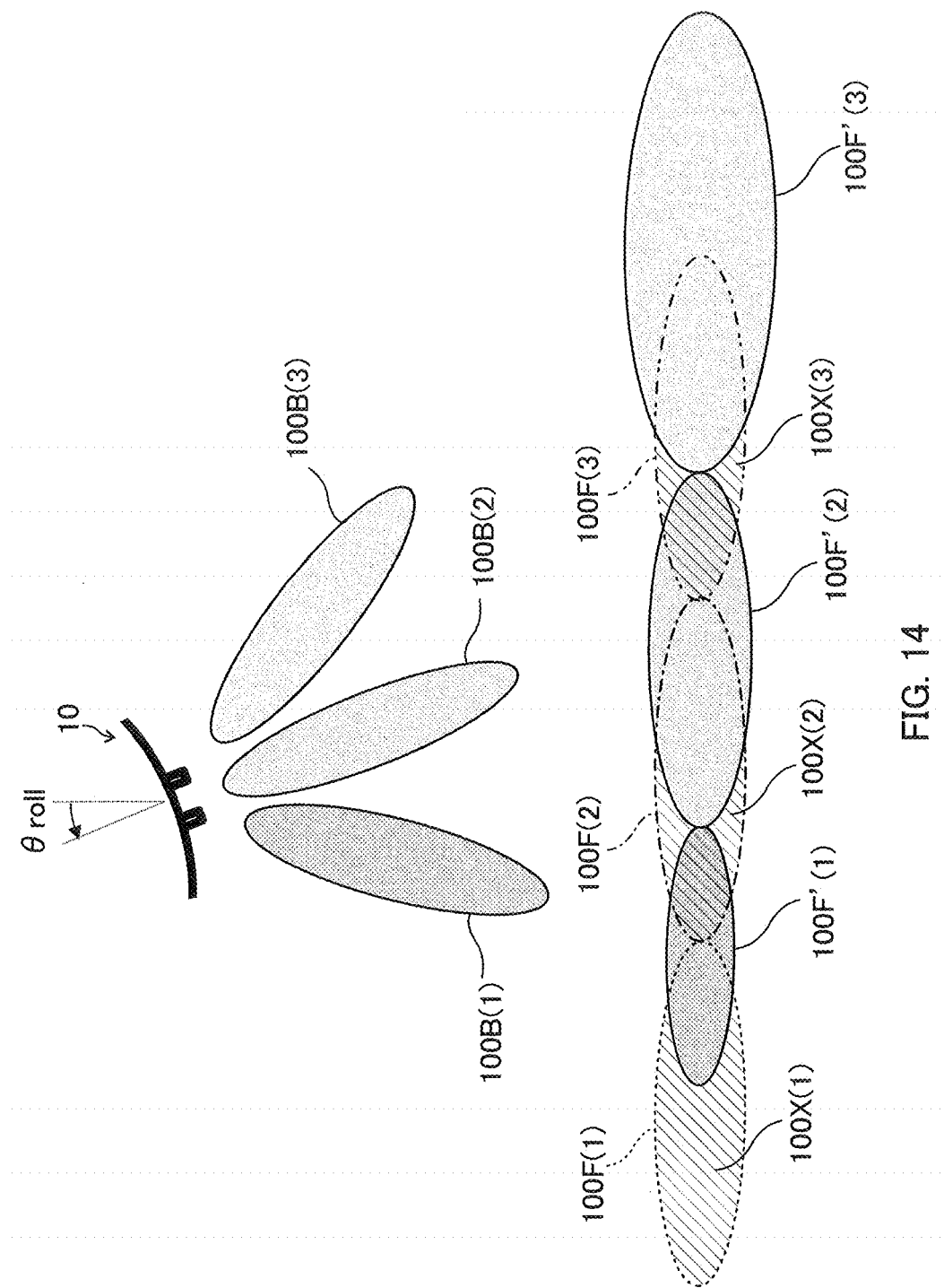
FIG. 14 is an illustration showing an example of a change in footprints of SSB beams due to a roll rotation of a HAPS according to a comparative reference example.

FIG. 14 is an illustration showing an example of changes in the footprints of the SSB beams due to roll rotation of the HAPS 10 according to a comparative reference example. When the HAPS 10 exemplified in FIG. 13 rolls by an angle θroll in the left rotation direction in the figure, the SSB beams 100B(1) to 100B(3) also rotate by the same angle θroll as shown in FIG. 14, and the footprints 100F'(1) to 100F'(3) corresponding to the SSB beams 100B(1) to 100B(3) shift and move to the right in the figure, and their sizes also change. It is expected that many UEs 61 located in areas 100X(2) and 100X(3), in which the SSB beams to be received have changed due to this footprint shift and size change, respectively perform a connection recovery operation by the BFR described above, and the number of control signals by the BFR may increase. Since the area 100X(1) outside the footprint 100F'(1) corresponding to the SSB beam 100B(1) is outside the service area, a communication with the HAPS 10 is disconnected for many UEs 61 located in the area 100X(1).

When trying to perform a beam control for fixing the footprint of the cell 100C over the entire band of the broadened frequency band in the mobile communication system providing the HAPS 10 of the present embodiment, the circuit scale and power consumption in the base-station processing section 119 of the HAPS 10 may increase.

In the present embodiment, in order to suppress the increase in control signals and the disconnection of communication to and from the UE 61 in the cell 100C in case that there is the foregoing movement and attitude change of the HAPS 10, and to reduce the circuit scale and the power consumption in the base-station processing section 119, a footprint fixation control is performed by limiting to the plural SSB beams 100B(1) to 100B(3) formed in the cell 100C as shown below.

Figure 15:
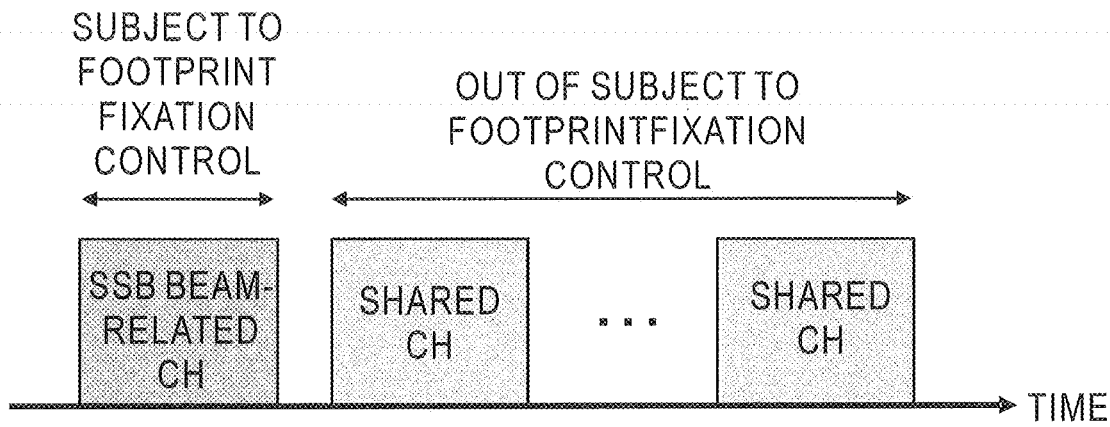
FIG. 15 is an illustration showing an example of switching on the time axis between SSB beam-related channels subject to a footprint fixation control and shared channels after initial access of each UE out of subject to the footprint fixation control in a HAPS of an embodiment.

FIG. 15 is an illustration showing an example of switching on the time axis between the SSB beam-related channels subject to the footprint fixation control (for example, SSB, PDCCH and PDSCH before initial access completion) and the shared channels after the initial access of each UE 61 out of subject to the footprint fixation control (for example, PDSCH after the completion of the initial access) in the HAPS 10 of the present embodiment. As shown in FIG. 15, in the HAPS 10 of the present embodiment, in the case of downlink, the footprint fixation control on the basis of information on the movement and attitude change of the HAPS 10 is performed by limiting to the radio resource part (RB of predetermined slot and subcarrier) of the SSB beam-related channel for transmitting periodic SS and PBCH, PDSCH before completion of the initial access, and the like, to the UE 61 in the cell 100C via the SSB beams 100B(1) to 100B(3). Similarly, in the case of uplink, the footprint fixation control on the basis of information on the movement and attitude change of the HAPS 10 is performed by limiting to the radio resource part (RB of predetermined slot and subcarrier) of the SSB beam-related channel for transmitting PRACH, PUSCH before completion of the initial access, and the like, from the UE 61 in the cell 100C via the SSB beams 100B(1) to 100B(3).

On the other hand, with respect to the radio resource part (RB) of the other shared channel such as PDSCH after completion of the initial access, which is transmitted to each UE 61 in the cell 100C via the UE individual beam in the downlink, the footprint fixation control on the basis of the information on the movement and attitude change of the HAPS 10 is not performed, because the control of the UE individual beam also serves as the footprint fixation control. Similarly, with respect to the radio resource part (RB) of the other shared channel such as PUSCH after completion of the initial access, which is received from each UE 61 in the cell 100C via the UE individual beam in the uplink, the footprint fixation control on the basis of the information on the movement and attitude change of the HAPS 10 is not performed, because the control of the UE individual beam also serves as the footprint fixation control.

The footprint fixation control on the basis of the information on the movement and attitude change of the HAPS 10 is performed by the base-station processing section 119. Footprint fixation control at the time of the transmission of the downlink is, for example, a digital beamforming control that applies a beamforming weight for transmission (hereinafter referred to as "BF weight") to the transmission signal in the frequency domain transmitted via the array antenna 130. Footprint fixation control at the time of the reception of the uplink is, for example, a digital beamforming control that applies a BF weight for SSB beam reception to the reception signal in the frequency domain received via the array antenna 130.

The footprint fixation control (digital beamforming control in frequency domain) for each of the plural SSB beams 100B(1) to 100B(3) needs to be performed for both downlink and uplink.

For example, in the case of downlink, the BF weight is applied to a modulation symbol to be transmitted in the radio resource (RB) of the SSB beam-related channel for transmitting SS, PBCH, and PDSCH before completion of the initial access, etc. that are related to the SSB beam 100B, and the phase and amplitude of the modulation symbol are controlled, so that the main beam of the SSB beam 100B at the time of transmission is directed to each of the three pre-set target points of the cell 100C on the ground (or on the sea).

In the case of uplink, the BF weight is applied to a modulation symbol received in the radio resource (RB) of the SSB beam-related channel such as PRACH and the PDSCH after completion of the initial access that are related to the SSB beam 100B, and the phase and amplitude of the modulation signal are controlled, so that the main beam of the SSB beam 100B at the time of reception is directed to each of the three pre-set target points of the cell 100C on the ground (or on the sea).

The BF weight is calculated based on antenna information on the shape of the array antenna 130 and the arrangement of the antenna elements 130a, and HAPS body information on at least one of the position and the attitude of the HAPS 10. The HAPS body information used for calculation of the BF weight may be only the position information on the HAPS 10, may be only the attitude information on the HAPS 10, or may be information on both the position and attitude of the HAPS 10. The position information on the HAPS 10 may be the absolute position (for example, latitude, longitude and altitude) of the HAPS 10, or may be relative position information with respect to the target point of the objective service area. The attitude information of the HAPS 10 may be, for example, at least one of the yaw rotation angle (rotation angle of the airframe about the vertical axis), the roll rotation angle (rotation angle of the airframe about the axis in the direction of travel) and the pitch rotation angle (rotation angle of the airframe about the horizontal axis perpendicular to the direction of travel) with respect to the reference attitude of the HAPS 10.

Figure 16:
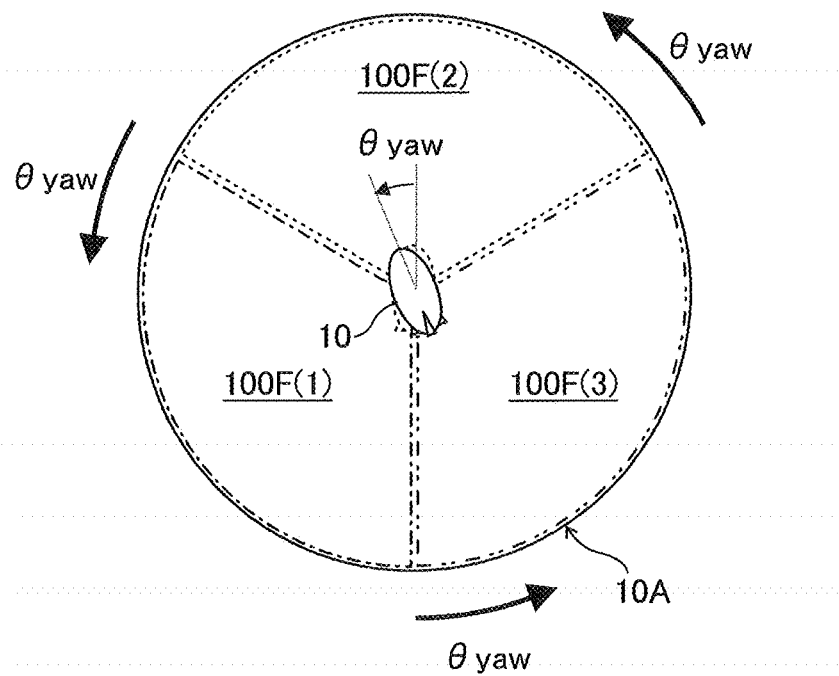
FIG. 16 is an illustration showing an example of an effect of a footprint fixation control of SSB beams during yaw rotation of a HAPS of an embodiment.
Figure 17:
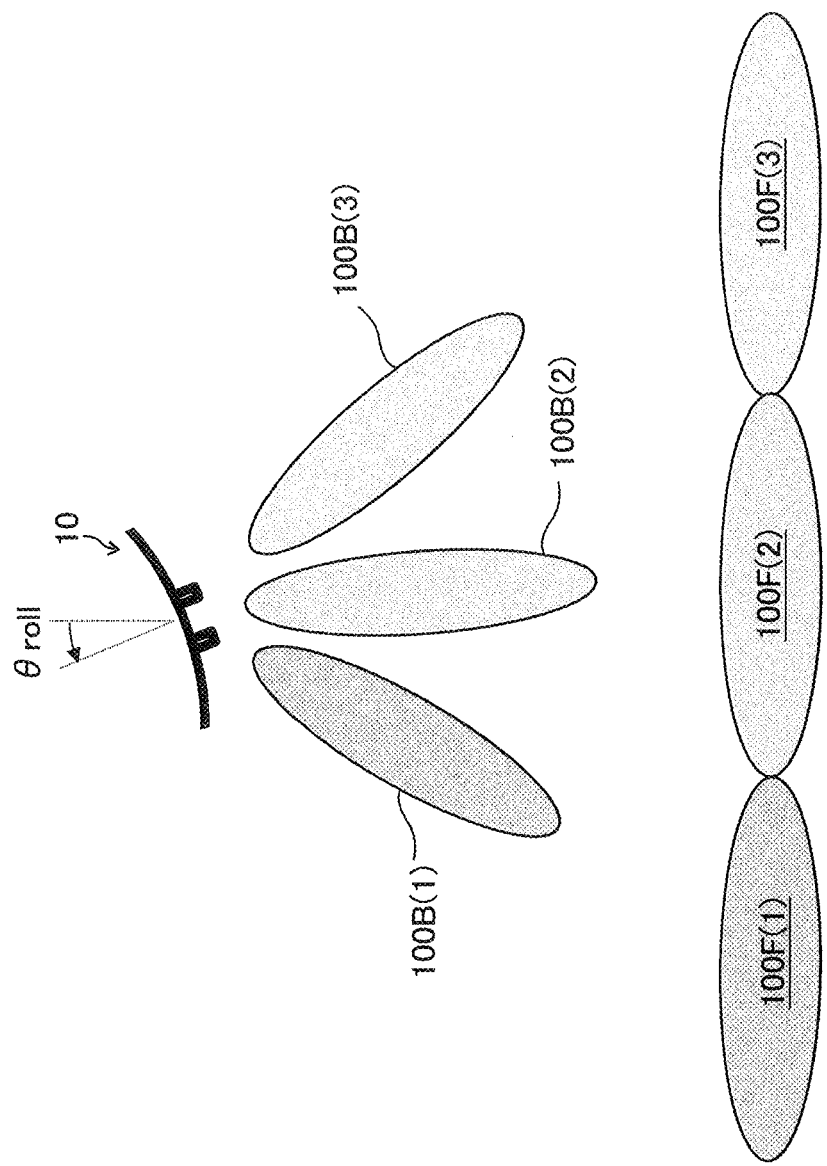
FIG. 17 is an illustration showing an example of an effect of a footprint fixation control of SSB beams during roll rotation of a HAPS of an embodiment.

According to the HAPS 10 of the present embodiment, by the footprint fixation control on the basis of the information on the movement and the attitude change of the HAPS 10 that is performed by limiting to the radio resource part (RB) of the SSB beam-related channel, for example, even if the HAPS 10 rotates in yaw as shown in FIG. 16, the positions of the footprints 100F(1) to 100F(3) of the SSB beams 100B(1) to 100B(3) are fixed and maintained. Therefore, it is possible to suppress the increase of the control signals due to the aforementioned BFR caused by the yaw rotation of the HAPS 10. Furthermore, even if the HAPS 10 rotates in roll as shown in FIG. 17, the positions of the footprints 100F(1) to 100F(3) of the SSB beams 100B(1) to 100B(3) are fixed and maintained. Therefore, it is possible to suppress the increase of the control signals due to the aforementioned BFR caused by the roll rotation of the HAPS 10, and the disconnection of communication with the HAPS 10 does not occur.

Moreover, according to the HAPS 10 of the present embodiment, with respect to the radio resource part (RB) of other shared channel such as PDSCH after completion of the initial access which is transmitted to each UE 61 in the cell 100C via the UE individual beam, the footprint fixation control on the basis of the information on the movement and attitude change of the HAPS 10 is not performed. With respect to the radio resource part (RB) of the other shared channel such as PUSCH after completion of the initial access which is received from each UE 61 in the cell 100C via the UE individual beam, the footprint fixation control on the basis of the information on the movement and attitude change of the HAPS 10 is not performed. Therefore, unlike the case of performing the footprint fixation control for the entire band for the cell 100C, it is possible to suppress the increase in circuit size and power consumption in the base-station processing section 119 of the HAPS 10.

Figure 18:
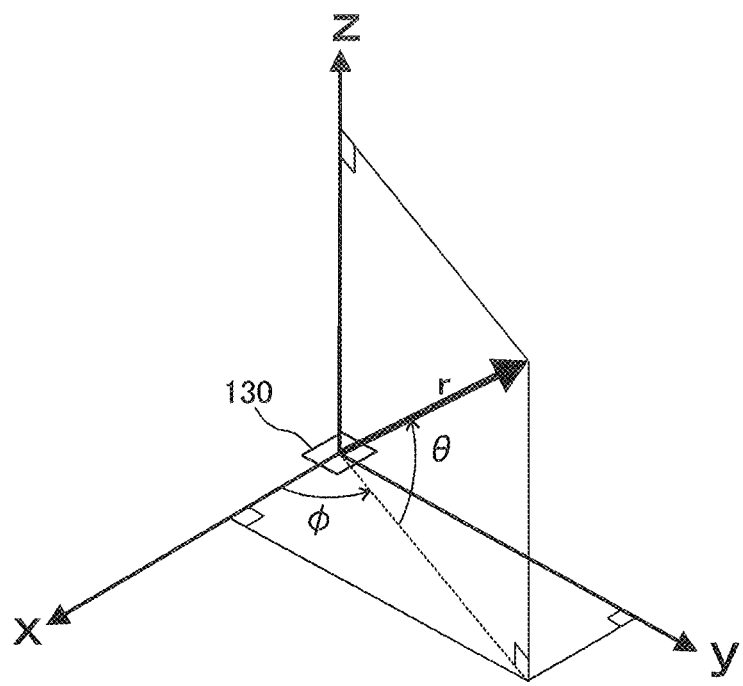
FIG. 18 is an illustration showing definitions of azimuth angle and elevation angle in a coordinate system with reference to a position of a HAPS.

FIG. 18 is an illustration showing definitions of the azimuth angle $\varphi$ and the elevation angle $\theta$ in the coordinate system with reference to the position of the HAPS 10. In order to perform a control such that the main beam of the beam for control is directed in the direction of the azimuth angle $\varphi$ and the elevation angle $\theta$ corresponding to the target point set in advance, the BF weight for transmission and the BF weight for reception may be calculated, for example, as described in the following publications (see Japanese Patent Application Laid-Open No. 2020-036070 (application number: Japanese Patent Application 2018-158192)).

It is noted that the BF weight may be calculated and used at the timing of performing the footprint fixation control of the SSB beam based on the information on the movement and attitude change of the HAPS 10, or may be calculated in advance for plural positions and attitudes of the HAPS 10. For example, the BF weights may be calculated in advance and stored in association with each of plural sets of positions and attitudes different from each other in the predicted movement route of the HAPS 10 with reference to the position of the service area, the BF weight corresponding to the current position and attitude of the HAPS 10 obtained by the position/attitude information obtaining section 120 described below may be selected from the stored plural BF weights that respectively correspond to the plural sets of positions and attitudes.

Figure 19:
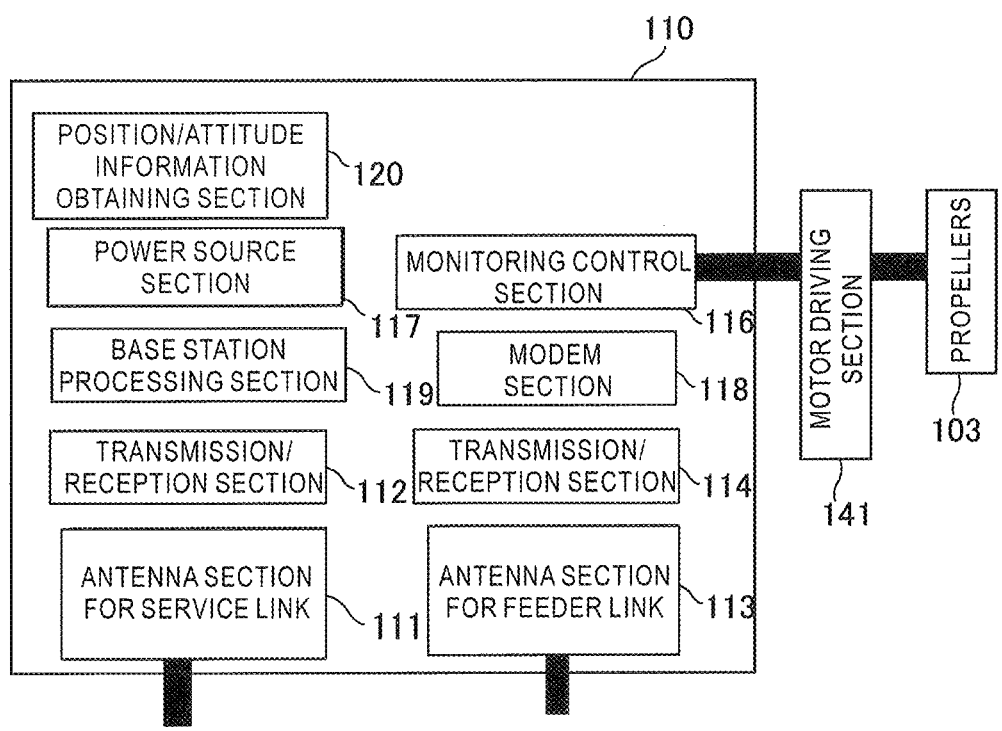
FIG. 19 is a block diagram showing an example of a main configuration of a relay communication station of a HAPS of an embodiment.

FIG. 19 is a block diagram showing an example of a main configuration of the relay communication station 110 of the HAPS 10 of the present embodiment. The relay communication station 110 in FIG. 19 is an example of a base-station type relay communication station. The relay communication station 110 is provided with an antenna section for service link 111, a transmission/reception section 112, an antenna section for feeder link 113, a transmission/reception section 114, a monitoring control section 116, a power supply section 117, a modem section 118, a base-station processing section 119, and a position/attitude information obtaining section 120.

The antenna section for service link 111 has an array antenna that forms a radial beam toward the ground (or the sea), and forms a three-dimensional cell 100C that can communicate with the UE 61. The transmission/reception section 112 constitutes a first-radio communication section together with the antenna section for service link 111, has a duplexer (DUP: DUPlexer) and an amplifier, etc., and transmits radio signals to the UE 61 located in the three-dimensional cell 100C and receives radio signals from the UE 61 via the antenna section for service link 111.

The antenna section for service link 111 and the transmission/reception section 112 also function as an uplink (UL) reception section that receives an uplink signal capable of identifying the UE 61 from each of the plural UEs 61 via the array antenna 130.

The antenna section for feeder link 113 has a directional antenna for radio communication with the feeder station 70 on the ground (or the sea). The transmission/reception section 114 constitutes a second-radio communication section together with the antenna section for feeder link 113, has a duplexer (DUP: DUPlexer) and an amplifier, etc., and transmits radio signals to the feeder station 70 and receives radio signals from the feeder station 70 via the antenna section for feeder link 113.

The monitoring control section 116 is composed of, for example, a CPU and a memory, etc., and monitors the operation processing status of each section in the HAPS 10 and controls each section by executing a preinstalled program. In particular, the monitoring control section 116 controls the motor driving section 141 that drives the propellers 103 and 202 to move the HAPS 10 to the target position and to keep it near the target position by executing a control program.

The power supply section 117 supplies electric power output from the batteries 106 and 204 to each section in the HAPS 10. The power supply section 117 may have a function of storing electric power generated by the photovoltaic panel, etc., or electric power supplied from the outside in the batteries 106 and 204.

The modem section 118, for example, performs demodulation process and decoding process on reception signals received from the feeder station 70 via the antenna section for feeder link 113 and the transmission/reception section 114, and generates data signals to be output to the base-station processing section 119 side. The modem section 118 performs encoding process and modulation process on data signals received from the base-station processing section 119 side, and generates transmission signals to be transmitted to the feeder station 70 via the antenna section for feeder link 113 and the transmission/reception section 114.

The base-station processing section 119 has, for example, a function (for example, functions of e-NodeB, g-NodeB, etc.) that performs base band process based on the method that conforms to the LTE/LTE-Advanced standard or the next-generation standard such as the 5th generation.

Furthermore, the base-station processing section 119 performs footprint fixation control (digital beamforming control in frequency domain) for the aforementioned SSB beams 100B(1) to 100B(3) for both downlink and uplink.

The baseband processing in the base-station processing section 119 includes a process of applying precoding for beamforming for individual communication in the frequency domain for each UE 61, regarding the radio resource part for individual communication (for example, RB to which PDSCH after completion of initial access is assigned) for performing downlink communication via the UE individual beam with each of the plural UEs locating in the cell 100C.

Moreover, the baseband processing in the base-station processing section 119 includes a process of applying a postcoding (also referred to as "decoding") for beamforming for individual communication in the frequency domain for each UE 61, regarding the radio resource part for individual communication (for example, RB to which PUSCH after completion of initial access is assigned) for performing uplink communication via the UE individual beam with each of the plural UEs locating in the cell 100C.

The position/attitude information obtaining section 120 obtains information on position of the HAPS 10, information on attitude of the HAPS 10, or information on the both. For example, the position/attitude information obtaining section 120 of the present embodiment obtains information on both the position and attitude of the HAPS 10, based on the output of the GPS receiver, gyro sensor, acceleration sensor, etc. incorporated in the HAPS 10.

Figure 20:
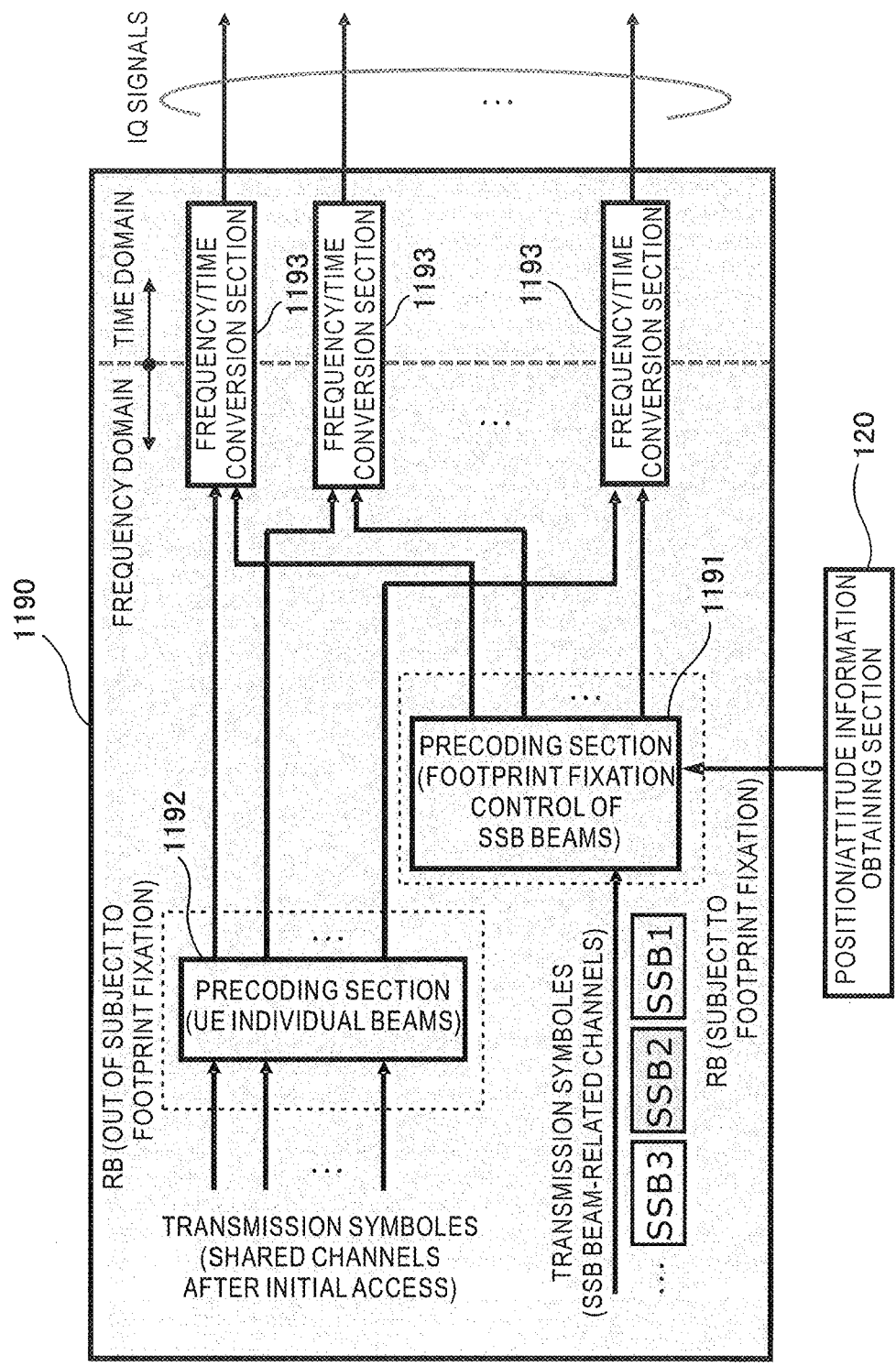
FIG. 20 is a block diagram showing an example of a main configuration of a downlink (DL) transmission section in a base-station processing section of the relay communication station of FIG. 19.

FIG. 20 is a block diagram showing an example of a main configuration of a downlink (DL) transmission section 1190 in the base-station processing section 119 of the relay communication station 110 of FIG. 19. In FIG. 20, only the main configuration related to the present embodiment is illustrated, and an illustration of other components necessary for communication with the UE 61 is omitted.

In FIG. 20, the downlink (DL) transmission section 1190 is provided with a first precoding section 1191, a second precoding section 1192, and plural frequency/time conversion sections 1193.

The first precoding section (hereinafter referred to as "SSB precoding section") 1191 performs a precoding process for beamforming with the footprint fixation control for the SSB beams 100B(1) to 100B(3) in the cell 100. For example, transmission symbols SSB1, SSB2, and SSB3 of the SSB beam-related channels such as SS, PBCH, and PDSCH before completion of the initial access, which are to be transmitted to each SSB area via each of the SSB beams 100B(1) to 100B(3), are assigned to a predetermined RB that is subject to the footprint fixation control, and are sequentially input to the SSB precoding section 1191. When the transmission symbols of the SSB beam-related channel are input, the SSB precoding section 1191 generates IQ signals in the plural frequency domains for the plural antenna elements 130a of the array antenna 130 by multiplying the transmission symbol by the BF weight to which the footprint fixation control is applied and which corresponds to the SSB area in which the transmission symbol is transmitted. Each of the IQ signals in the plural frequency domains is subjected to an OFDM modulation (subcarrier modulation) using subcarriers corresponding to the predetermined RB, and then input to the corresponding frequency/time conversion section 1193.

The second precoding section (hereinafter referred to as "UE precoding section") 1192 performs a precoding process for directing the UE individual beam to each of the UEs 61 in the cell 100. For example, each of the transmission symbols for plural UEs of physical channels (for example, PDSCH before completion of the initial access) other than the SSB beam-related channels, which are transmitted to the plural UEs 61, is assigned to a predetermined RB (UE individual RB) that are not subject to the footprint fixation control, and is input in parallel to the UE precoding section 1192. When transmission symbols destined for the plural UEs are input, the UE precoding section 1192 generates IQ signals in the plural frequency domains for the plural antenna elements 130a of the array antenna 130 by multiplying the transmission symbols destined for the plural UEs by the BF weight for each UE to which the footprint fixation control is not applied. The BF weight for each UE can be calculated, for example, based on CSI (Channel State Information) received from the UE 61. Each of the IQ signals in the plural frequency domains is subjected to an OFDM-modulation (subcarrier modulation) using subcarriers corresponding to the predetermined RB, and then input to the corresponding frequency/time conversion section 1193.

The plural frequency/time conversion section 1193 are provided so as to correspond to each of the plural antenna elements 130a of the array antenna 130. Each of the plural frequency/time conversion sections 1193 convers the IQ (In-phase-Quadrature) signals in the plural frequency domains corresponding to the plural antenna elements 130a which are output from the first precoding section 1191 and the second precoding section 1192, to IQ signals in the plural time domains, by an IFFT (Inverse Fast Fourier Transform), for example. The IQ signal in the time domain, which is output from each frequency/time conversion section 1193, is supplied to the transmission/reception section 112 (see FIG. 19).

Figure 21:
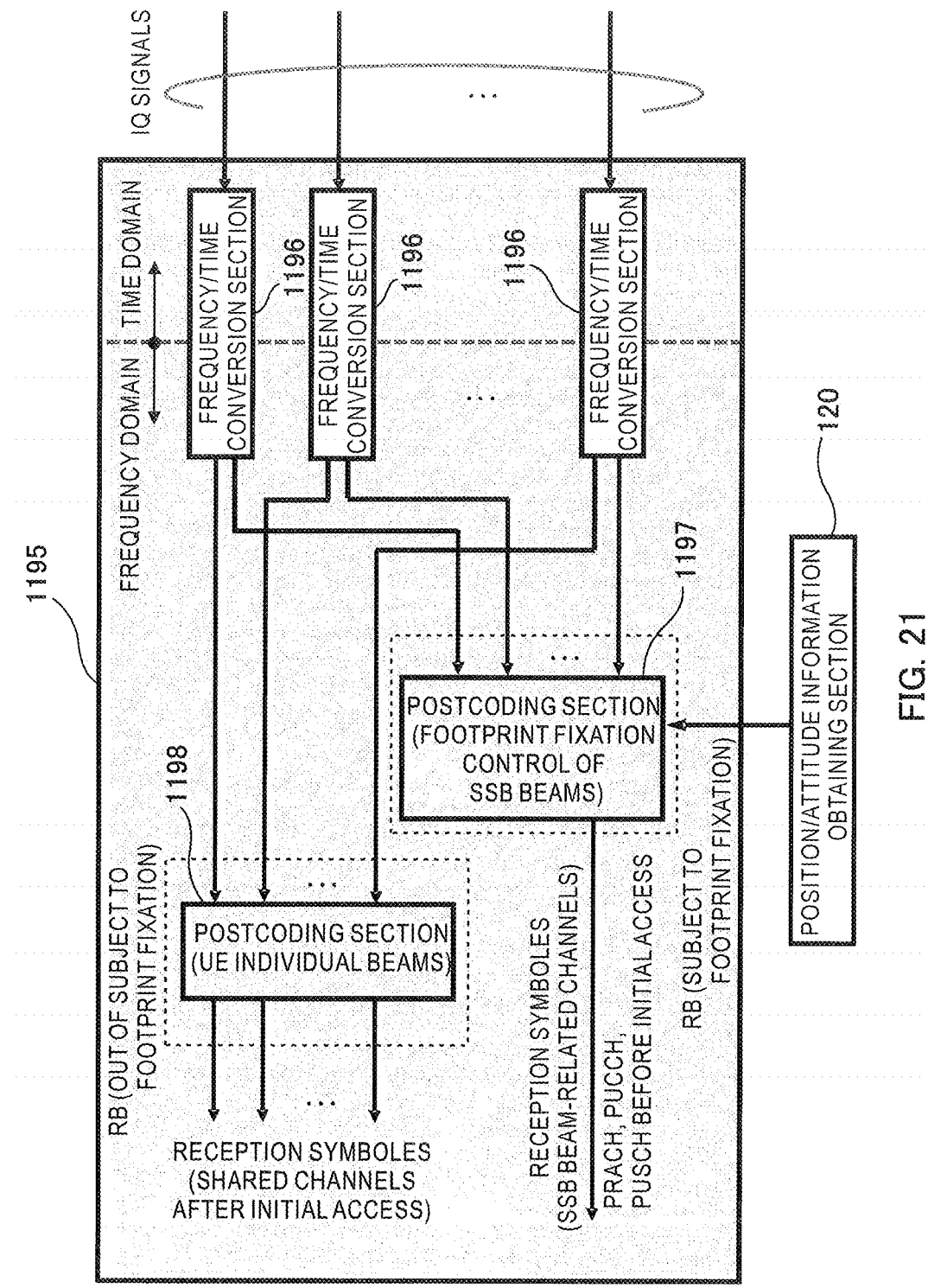
FIG. 21 is a block diagram showing an example of a main configuration of an uplink (UL) reception section in a base-station processing section of the relay communication station of FIG. 19.

FIG. 21 is a block diagram showing an example of a main configuration of an uplink (UL) reception section 1195 in the base-station processing section 119 of the relay communication station 110 of FIG. 19. It is noted that, in FIG. 21, only the main configuration related to the present embodiment is illustrated, and the illustration of other components required for communication with the UE 61 is omitted.

In FIG. 21, the uplink (DL) reception section 1195 is provided with plural frequency/time conversion sections 1196, a first postcoding section 1197, and a second postcoding section 1198.

The plural frequency/time conversion sections 1196 are provided so as to correspond to each of the plural antenna elements 130a of the array antenna 130. Each of the plural frequency/time conversion sections 1196 converts the reception signals in the plural time domains, which are received by the plural antenna elements 130a and output from the transmission/reception section 112 (see FIG. 19), to IQ (In-phase-Quadrature) signals in plural frequency domains, by an FFT (Fast Fourier Transform), for example. Each of the IQ signals in the plural frequency domains, which is output from the plural frequency/time conversion sections 1196, is subjected to an OFDM demodulation process, and then supplied to each of the first postcoding section 1197 and the second postcoding section 1198.

The first postcoding section (hereinafter referred to as "SSB postcoding section") 1197 performs a postcoding process for beamforming with the footprint fixation control for the SSB beams 100B(1) to 100B(3) in the cell 100. For example, each of the reception signals (IQ signals) in the plural frequency domains, which are input from the plural frequency/time conversion sections 1196 to the SSB postcoding section 1197, includes signals of reception symbols of the SSB beam-related channels such as PRACH, PUCCH, and PUSCH before completion of the initial access which are respectively received from the SSB area via the SSB beams 100B(1) to 100B(3). The SSB postcoding section 1197 separates and outputs the reception symbols of the SSB beam-related channels such as PRACH, PUCCH, and PUSCH before completion of the initial access, which are assigned to the predetermined RB to be subjected to the footprint fixation control, by sequentially multiplying the reception signals by the BF weight to which the footprint fixation control is applied corresponding to each SSB area.

The second postcoding section (hereinafter referred to as "UE postcoding section") 1198 performs a postcoding process for directing the UE individual beam to each of the UEs 61 in the cell 100. For example, each of the reception signals (IQ signals) in the plural frequency domains, which are input from the plural frequency/time conversion sections 1196 to the UE postcoding section 1198, includes signals of reception symbols from each UE 61 received via each UE individual beam (for example, reception symbols of PUSCH after completion of the initial access). The UE postcoding section 1198 separates and outputs the reception symbol from each UE 61 by multiplying the reception signal by the BF weight for each UE to which the footprint fixation control is not applied.

As described above, according to the present embodiment, even if there is the movement and attitude change of the HAPS 10, it is possible to suppress the movement and deformation of the footprints of the SSB beams (beams for control) 100B(1) to 100B(3) for which specific radio resource parts assigned to control channels and the like in the cell 100C configuring the service area are used, the increase in control signals and disconnection of communication due to BFR between the UE 61 in the cell 100C can be suppressed, and the circuit scale and power consumption of the base-station processing section 119 can be reduced.

It is noted that the footprint fixation control of the SSB beams 100B(1) to 100B(3) in the embodiments may be autonomously determined and performed by the HAPS 10, or may be performed by a control command from an external apparatus such as a remote control apparatus or a server. The footprint fixation control of the SSB beams 100B(1) to 100B(3) may be performed periodically at predetermined time intervals, or may be performed when a movement distance or attitude change of the HAPS 10 becomes greater than a predetermined amount.

Moreover, the number of SSB beams in the embodiments may be 1, 2, or 4 or more.

The present invention can be applied regardless of the number of UEs (number of users) per radio resource (time/frequency resource). Moreover, the present invention is applicable both in a single-user transmission (for example, SU-MIMO transmission) in which a single UE utilizes a specific radio resource (time/frequency resource), and in a multi-user transmission (for example, MU-MIMO transmission) in which plural UEs use a specific radio resource (time/frequency resource).

It is noted that, the process steps and configuration elements of the relay communication station of the communication relay apparatus such as the HAPS 10, the feeder station, the gateway station, the management apparatus, the monitoring apparatus, the remote control apparatus, the server, the terminal apparatus (user equipment, mobile station, communication terminal), the base station and the base station apparatus described in the present description can be implemented with various means. For example, these process steps and configuration elements may be implemented with hardware, firmware, software, or a combination thereof.

With respect to hardware implementation, means such as processing units or the like used for establishing the foregoing steps and configuration elements in entities (for example, relay communication station, feeder station, gateway station, base station, base station apparatus, relay-communication station apparatus, terminal apparatus (user equipment, mobile station, communication terminal), management apparatus, monitoring apparatus, remote control apparatus, server, hard disk drive apparatus, or optical disk drive apparatus) may be implemented in one or more of an application-specific IC (ASIC), a digital signal processor (DSP), a digital signal processing apparatus (DSPD), a programmable logic device (PLD), a field programmable gate array (FPGA), a processor, a controller, a microcontroller, a microprocessor, an electronic device, other electronic unit, computer, or a combination thereof, which are designed so as to perform a function described in the present specification.

With respect to the firmware and/or software implementation, means such as processing units or the like used for establishing the foregoing configuration elements may be implemented with a program (for example, code such as procedure, function, module, instruction, etc.) for performing a function described in the present specification. In general, any computer/processor readable medium of materializing the code of firmware and/or software may be used for implementation of means such as processing units and so on for establishing the foregoing steps and configuration elements described in the present specification. For example, in a control apparatus, the firmware and/or software code may be stored in a memory and executed by a computer or processor. The memory may be implemented within the computer or processor, or outside the processor. Further, the firmware and/or software code may be stored in, for example, a medium capable being read by a computer or processor, such as a random-access memory (RAM), a read-only memory (ROM), a non-volatility random-access memory (NVRAM), a programmable read-only memory (PROM), an electrically erasable PROM (EEPROM), a FLASH memory, a floppy (registered trademark) disk, a compact disk (CD), a digital versatile disk (DVD), a magnetic or optical data storage unit, or the like. The code may be executed by one or more of computers and processors, and a certain aspect of functionalities described in the present specification may by executed by a computer or processor.

The medium may be a non-transitory recording medium. Further, the code of the program may be executable by being read by a computer, a processor, or another device or an apparatus machine, and the format is not limited to a specific format. For example, the code of the program may be any of a source code, an object code, and a binary code, and may be a mixture of two or more of those codes.

The description of embodiments disclosed in the present specification is provided so that the present disclosures can be produced or used by those skilled in the art. Various modifications of the present disclosures are readily apparent to those skilled in the art and general principles defined in the present specification can be applied to other variations without departing from the spirit and scope of the present disclosures. Therefore, the present disclosures should not be limited to examples and designs described in the present specification and should be recognized to be in the broadest scope corresponding to principles and novel features disclosed in the present specification.

REFERENCE SIGNS LIST

10: HAPS (communication relay apparatus)
10A: service area
70: GW station (feeder station)
71: antenna
80: mobile communication network
100B(1) to 100B(3): SSB beam
100C: cell
100F(1) to 100F(3): footprint of SSB beam
100F'(1) to 100F'(3): footprint of SSB beam after change
100X(1) to 100(X): area where SSB beam changed
110: relay communication station
111: antenna section for service link
112: transmission/reception section
113: antenna section for feeder link
114: transmission/reception section
116: monitoring control section
117: power supply section
118: modem section
119: base-station processing section
120: attitude-information obtaining section
130: array antenna
130a: antenna element
1190: downlink (DL) transmission section
1191: first precoding section (SSB precoding section)
1192: second precoding section (UE precoding section)
1193: frequency/time conversion section
1195: uplink (UL) reception section
1196: frequency/time conversion section
1197: first postcoding section (SSB post-precoding section)
1198: second postcoding section (UE post-precoding section)

The invention claimed is:

1. An upper-airspace staying type communication relay apparatus for wirelessly communicating with a terminal apparatus, comprising:
　　an array antenna having plural antenna elements, the array antenna forming a service link cell capable of performing a radio communication with the terminal apparatus;
　　an information obtaining section for obtaining information on at least one of a position and attitude of the communication relay apparatus; and
　　a base-station processing section for performing a baseband process including a process for applying a precoding for beamforming in a frequency domain to a downlink transmission signal to be transmitted via the array antenna, and a process of applying a postcoding for beamforming in a frequency domain to an uplink reception signal received via the array antenna,
　　wherein the base-station processing section:
　　　performs, with respect to a radio resource part for control communication by which a communication via a single or plural beams for control formed for the cell is performed among downlink radio resources used for the service link, a footprint fixation control for performing a precoding for beamforming in the frequency domain so as to fix a position of a footprint corresponding to the beam for control, based on information on at least one of the position and attitude of the communication relay apparatus obtained by the information obtaining section;
　　　does not perform, with respect to downlink radio resource parts other than the radio resource part for control communication, the footprint fixation control on the basis of the information on at least one of the position and attitude of the communication relay apparatus;
　　　performs, with respect to a radio resource part for control communication by which an uplink communication via a single or plural beams for control formed for the cell is performed among uplink radio resources used for the service link, a footprint fixation control for performing a postcoding for beamforming in the frequency domain so as to fix a position of a footprint corresponding to the beam for control, based on information on at least one of the position and attitude of the communication relay apparatus obtained by the information obtaining section; and does not perform, with respect to uplink radio resource parts other than the radio resource part for control communication, the footprint fixation control on the basis of the information on at least one of the position and attitude of the communication relay apparatus, and wherein, in the footprint fixation control, a beamforming is performed so that a main beam of the beam for control is directed toward a target point set in advance.

2. The communication relay apparatus according to claim 1, wherein the radio resource part for downlink control communication includes a radio resource part to which a synchronization signal (SS) and a broadcast channel (PBCH) are assigned, and wherein the radio resource part for downlink control communication includes a radio resource part to which a physical downlink control channel (PDCCH) is assigned, and a radio resource part to which a physical downlink shared channel (PDSCH) before completion of initial access from the terminal apparatus to the cell is assigned.

3. The communication relay apparatus according to claim 1 or 2, wherein the radio resource part for uplink control communication includes a radio resource part to which a physical random access channel (PRACH) is assigned, and wherein the radio resource part for uplink control communication includes a radio resource part to which a physical uplink control channel (PUCCH) is assigned, and a radio resource part to which a physical uplink shared channel (PUSCH) before completion of initial access from the terminal apparatus to the cell is assigned.

4. The communication relay apparatus according to claim 1, wherein the communication relay apparatus:

pre-calculates and stores beamforming (BF) weights in association with each of plural sets of positions and attitudes different from each other on a predicted moving route of the communication relay apparatus with reference to a position of a service area; and selects a beamforming (BF) weight corresponding to the position and attitude of the communication relay apparatus obtained by the information obtaining section, from the stored beamforming (BF) weights corresponding to each of the plural sets of positions and attitudes.

5. The communication relay apparatus according to claim 2, wherein the radio resource part for uplink control communication includes a radio resource part to which a physical random access channel (PRACH) is assigned, and wherein the radio resource part for uplink control communication includes a radio resource part to which a physical uplink control channel (PUCCH) is assigned, and a radio resource part to which a physical uplink shared channel (PUSCH) before completion of initial access from the terminal apparatus to the cell is assigned.

6. The communication relay apparatus according to claim 2, wherein the communication relay apparatus:

pre-calculates and stores beamforming (BF) weights in association with each of plural sets of positions and attitudes different from each other on a predicted moving route of the communication relay apparatus with reference to a position of a service area; and selects a beamforming (BF) weight corresponding to the position and attitude of the communication relay apparatus obtained by the information obtaining section, from the stored beamforming (BF) weights corresponding to each of the plural sets of positions and attitudes.

7. The communication relay apparatus according to claim 3, wherein the communication relay apparatus:

pre-calculates and stores beamforming (BF) weights in association with each of plural sets of positions and attitudes different from each other on a predicted moving route of the communication relay apparatus with reference to a position of a service area; and selects a beamforming (BF) weight corresponding to the position and attitude of the communication relay apparatus obtained by the information obtaining section, from the stored beamforming (BF) weights corresponding to each of the plural sets of positions and attitudes.

8. The communication relay apparatus according to claim 5, wherein the communication relay apparatus:

pre-calculates and stores beamforming (BF) weights in association with each of plural sets of positions and attitudes different from each other on a predicted moving route of the communication relay apparatus with reference to a position of a service area; and selects a beamforming (BF) weight corresponding to the position and attitude of the communication relay apparatus obtained by the information obtaining section, from the stored beamforming (BF) weights corresponding to each of the plural sets of positions and attitudes.

* * * * *